United States Patent
Ray et al.

(10) Patent No.: US 9,844,073 B2
(45) Date of Patent: Dec. 12, 2017

(54) METHODS AND APPARATUS FOR CONTENTION-BASED UPLINK ACCESS IN WIRELESS COMMUNICATION SYSTEMS

(75) Inventors: Siddharth Ray, Palo Alto, CA (US);
Ashwin Sampath, Skillman, NJ (US);
Ritesh Kumar Madan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 12/987,946

(22) Filed: Jan. 10, 2011

(65) Prior Publication Data
US 2012/0014269 A1    Jan. 19, 2012

Related U.S. Application Data

(60) Provisional application No. 61/294,079, filed on Jan. 11, 2010.

(51) Int. Cl.
*H04W 74/00* (2009.01)

(52) U.S. Cl.
CPC ........ *H04W 74/006* (2013.01); *H04W 74/008* (2013.01)

(58) Field of Classification Search
CPC ..... H04W 52/04; H04W 52/06; H04W 52/08; H04W 52/10; H04W 52/12; H04W 52/125; H04W 52/14; H04W 52/143; H04W 52/146; H04W 52/16; H04W 74/006; H04W 74/008
USPC ....... 370/210, 252, 312, 325, 329, 331, 310, 370/445, 447, 450
See application file for complete search history.

(56) References Cited

U.S. PATENT DOCUMENTS

| | | | | |
|---|---|---|---|---|
| 6,195,338 B1* | 2/2001 | Decker | ............... | H04W 74/006 370/252 |
| 6,567,416 B1* | 5/2003 | Chuah | ................. | H04L 12/2602 370/347 |
| 6,879,579 B1* | 4/2005 | Myles | ................... | H04W 74/02 370/348 |

(Continued)

FOREIGN PATENT DOCUMENTS

| | | |
|---|---|---|
| CN | 101300756 A | 11/2008 |
| EP | 2101539 A2 | 9/2009 |

(Continued)

OTHER PUBLICATIONS

A. J. Viterbi, "Capacity of a simple stable protocol for short message service over a CDMA network," Communications & Cryptography, R. Blahut, Ed. KAP, 1994, pp. 423-429.

(Continued)

*Primary Examiner* — Benjamin H Elliott, IV
*Assistant Examiner* — Prince A Mensah
(74) *Attorney, Agent, or Firm* — Arent Fox, LLP

(57) ABSTRACT

Methods and apparatus for contention-based access in a wireless communication system are disclosed. A base station may determine a contention-based resource allocation comprising a subset of available system resources. Information related to the contention-based resources may be sent to a user device. In addition, state information may be provided to the UE. The UE may generate and send a contention-based uplink transmission consistent with the allocated resources and state information.

31 Claims, 13 Drawing Sheets

(56) References Cited

U.S. PATENT DOCUMENTS

| | | | |
|---|---|---|---|
| 2006/0268764 A1* | 11/2006 | Harris | 370/328 |
| 2008/0102822 A1* | 5/2008 | Feng et al. | 455/425 |
| 2008/0233964 A1* | 9/2008 | McCoy | H04W 72/0413 455/450 |
| 2008/0253326 A1* | 10/2008 | Damnjanovic | 370/329 |
| 2008/0279257 A1* | 11/2008 | Vujcic et al. | 375/132 |
| 2008/0304448 A1* | 12/2008 | Hosein | H04W 72/08 370/329 |
| 2009/0092086 A1* | 4/2009 | Lee | H04B 7/2615 370/329 |
| 2009/0303937 A1 | 12/2009 | Sawahashi et al. | |
| 2010/0027502 A1 | 2/2010 | Chen et al. | |
| 2010/0085954 A1 | 4/2010 | Keshavarzian et al. | |
| 2010/0111029 A1* | 5/2010 | Chou | H04J 3/0682 370/329 |
| 2010/0135170 A1* | 6/2010 | Fan | H04W 28/16 370/252 |
| 2010/0208608 A1* | 8/2010 | Wang | 370/252 |
| 2010/0215017 A1* | 8/2010 | Li et al. | 370/330 |

FOREIGN PATENT DOCUMENTS

| | | |
|---|---|---|
| JP | 2003348652 A | 12/2003 |
| JP | 2009278658 A | 11/2009 |
| JP | 2010518686 A | 5/2010 |
| WO | 2008097181 A2 | 8/2008 |
| WO | WO-2009003330 A1 | 1/2009 |

OTHER PUBLICATIONS

Ericsson et al: "Contention based uplink transmissions", 3GPP Draft; R2-093812_C0ntention_Based_Uplink, 3rd Generation Partnership Project (3GPP), Mobile Competence Centre ; 650, Route Des Lucioles ; F-06921 Sophia-Antipolis Cedex ; France, no. Los Angeles, USA; 20090623, Jun. 23, 2009, XP05035202.

International Search Report and Written Opinion—PCT/US2011/020896, International Search Authority—European Patent Office—May 2, 2011.

"LTE; Feasibility study for Further Advancements for E-UTRA (LTE-Advanced) (3GPP TR 36.912 version 9.1.0 Release 9)" Technical Report, European Telecommunications Standards Institute (ETSI), 650, Route Des Lucioles ; F-06921 Sophia-Antipolis ; France, No. V9.1.0, Jan. 1, 2010, XP014045013, p. 20-p. 21.

Ito M., et al., "Research on Congestion Control Method for Random Access Channel in Mobile Communications Employing Priority," The Information Processing Society of Japan, 66th (2004) Proceedings of National Conference (3), Mar. 9, 2004, pp. 3-389 to 3-390.

Taiwan Search Report—TW100101005—TIPO—datd Oct. 27, 2014.

* cited by examiner

METHODS AND APPARATUS FOR CONTENTION-BASED UPLINK ACCESS IN WIRELESS COMMUNICATION SYSTEMS

CROSS-REFERENCE TO RELATED APPLICATIONS

This application claims priority under 35 U.S.C. §119(e) to U.S. Provisional Patent Application Ser. No. 61/294,079, entitled "METHOD FOR CONTENTION BASED UPLINK ACCESS," filed on Jan. 11, 2010, the content of which is hereby incorporated by reference herein in its entirety for all purposes.

FIELD

This application is directed generally to wireless communications systems. More particularly, but not exclusively, the application relates to methods and apparatus for providing contention-based uplink access in wireless communication systems, such as Long Term Evolution (LTE) systems, using a subset of system resources for contention-based access.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), Node Bs, Enhanced Node Bs (EnodeBs), or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-input-single-output (SIMO), single-input-multiple output (SIMO), multiple-input-single-output (MISO), or multiple-input-multiple-output (MIMO) system.

One desired goal in wireless communication systems such as LTE systems is reduction of user plane latency. One way of achieving this is to reduce uplink latency by allowing contention-based uplink transmissions. Contention-based uplink transmissions are transmissions where multiple user devices transmit data packets over a common or shared channel resource. This approach can reduce delay when an offered load is not too large. Moreover, this approach may also allow savings on uplink control channel resources.

Contention-based protocols that can provide significantly higher data throughput compared to the Aloha protocol have been proposed. These approaches seek to control uplink arrival rates such that the ratio of total received power to background noise can be kept below a tolerable level.

SUMMARY

This disclosure relates generally to wireless communications systems. More particularly, but not exclusively, this disclosure relates to systems, methods, and apparatus for providing contention-based uplink access in a subset of system resources, such as in an LTE communication system.

For example, in one aspect, the disclosure relates to a method for wireless communications. The method may include determining contention-based grant information including information allocating a subset of system resources for contention-based access and signaling the contention-based grant information to one or more user devices. The method may further include measuring a first set of contention-based uplink transmissions received during a first uplink transmission period to generate power metric, determining a state value based upon the power metric and a background noise metric, and signaling the state value to the one or more user devices, wherein the state value is usable by the one or more user devices in scheduling of a second set of contention-based uplink transmissions in the subset of system resources during a second uplink transmission period.

In another aspect, the disclosure relates to a method for wireless communications. The method may include receiving, from a base station, contention-based grant information including information allocating a subset of system resources for contention-based access. The method may further include receiving, from the base station, a state value. The method may further include determining a transmission probability based upon the state value. The method may further include sending, consistent with the contention-based grant information and transmission probability, a contention-based uplink transmission.

In another aspect, the disclosure relates to computer program products including computer-readable storage medium having instructions for causing a computer to perform the above-described methods.

In still another aspect, the disclosure relates to communication apparatus and devices configured to perform the above-described methods.

In yet another aspect, the disclosure relates to communication devices and apparatus including means for performing the above-described methods.

Additional aspects, features, and functionality are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
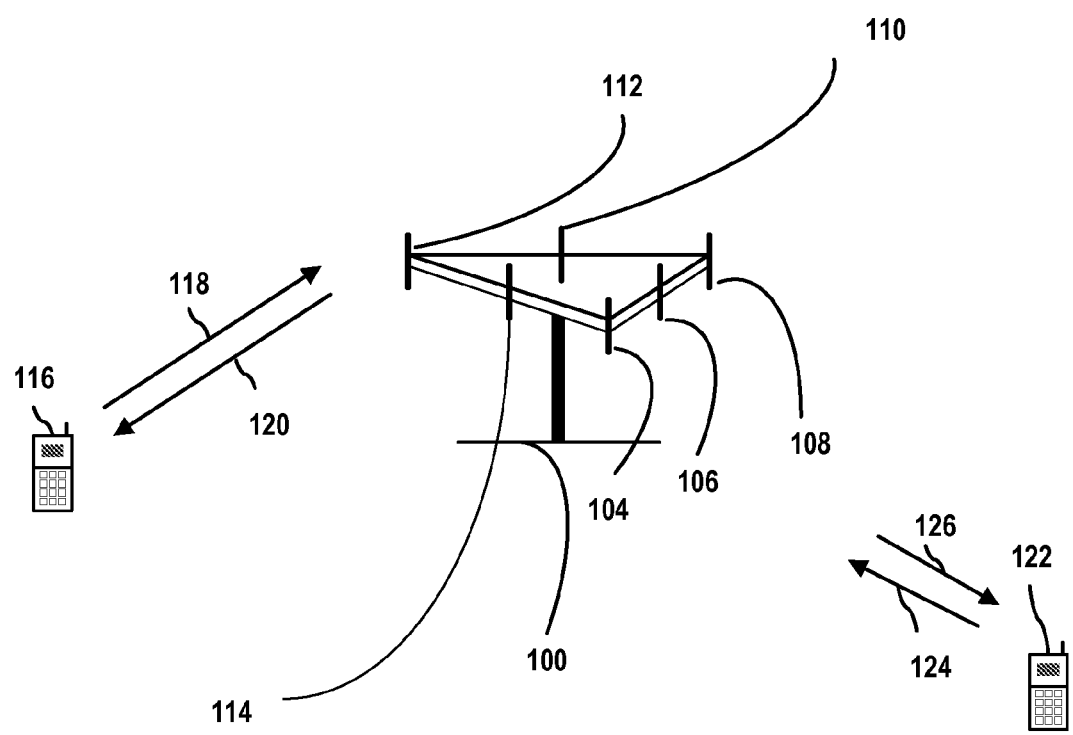
FIG. 1 illustrates a wireless communications system.

This disclosure relates generally to wireless communication systems and systems and method for facilitating contention-based uplink access, such as from a user terminal such as a UE, to a base station, such as an eNB, in an LTE communication system.

In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, WiMax networks, as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (W-CDMA), Time Division Synchronous CDMA (TD-SCDMA), as well as UTRA/UMTS-TDD 1.28 Mcps Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

The DL PHY channels may include: Physical Downlink Shared Channel (PDSCH), Physical Broadcast Channel (PBSH), Physical Multicast Channel (PMCH), Physical Downlink Control Channel (PDCCH), Physical Hybrid Automatic Repeat Request Indicator Channel (PHICH), and Physical Control Format Indicator Channel (PCFICH).

The UL PHY Channels may include: Physical Random Access Channel (PRACH), Physical Uplink Shared Channel (PUSCH), and Physical Uplink Control Channel (PUCCH).

The word "exemplary" is used herein to mean "serving as an example, instance, or illustration." Any aspect and/or embodiment described herein as "exemplary" are not necessarily to be construed as preferred or advantageous over other aspects and/or embodiments.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The spatial dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas, however, LTE systems do not in general provide for coordination of sending of reference signals from multiple base stations or eNBs.

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from a base station, access point or eNodeB (eNB) to a terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, Digital Video Broadcasting (DVB), and Digital Audio Broadcasting (DAB).

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot.

UMTS LTE may support scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain a radio frame may be defined to be 10 ms long and include 10 subframes of 1 millisecond (ms) each. Every sub frame consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the physical downlink control channel (PDCCH) is used for sending control information, the physical hybrid ARQ indicator channel (PHICH) for sending ACK/NACK, the physical control format indicator channel (PCFICH) for specifying the number of control symbols, the Physical Downlink Shared Channel (PDSCH) for data transmission, the Physical Multicast Channel (PMCH) for broadcast transmission using a Single Frequency Network (SFN), and the Physical Broadcast Channel (PBCH) for sending important system information within a cell. Supported modulation formats on the PDSCH in LTE include QPSK, 16QAM and 64QAM. Various modulation and coding schemes are defined for the various channels in the 3GPP specification.

In the uplink there are typically three physical channels. The Physical Random Access Channel (PRACH) is used for initial access and data transmission. When the UE is not uplink synchronized, data is sent on the Physical Uplink Shared Channel (PUSCH). If there is no data to be transmitted on the uplink for a UE, control information is transmitted on the Physical Uplink Control Channel (PUCCH). Supported modulation formats on the uplink data channel include QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "terminal," "user terminal," "user device," or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways.

FIG. 1 illustrates details of an implementation of a multiple access wireless communication system, which may be an LTE system, on which aspects as further described subsequently may be implemented. A base station or evolved NodeB (eNB) 100 (also know as an access point or AP) may include multiple antenna groups, one including 104 and 106, another including 108 and 110, and an additional one including 112 and 114. In FIG. 1, only two antennas are shown for each antenna group, however, more or fewer antennas may be utilized for each antenna group. The antennas of base station 100 may define a coverage area of a cell associated with the base station.

A user terminal or user equipment (UE) 116 may be within the cell coverage area and may be in communication with antennas 112 and 114, where antennas 112 and 114 transmit information to UE 116 over forward link (also known as a downlink or DL) 120 and receive information from UE 116 over a reverse link (also known as an uplink or UL) 118. A second UE 122 (and/or additional terminals or UEs not shown) may be in communication with antennas 106 and 108, where antennas 106 and 108 transmit information to UE 122 over forward link 126 and receive information from access terminal 122 over reverse link 124.

In a frequency division duplex (FDD) system, communication links 118, 120, 124 and 126 may use different frequency for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the base station, and may be associated with sector coverage areas, which may be sub-areas of the base station cell coverage area. Antenna groups may each be designed to communicate to UEs in a sector of the cell area covered by eNB 100. In communication over forward links 120 and 126, the transmitting antennas of eNB 100 may utilize beam-forming in order to improve the signal-to-noise ratio of forward links for the different access terminals 116 and 122. Also, an eNB may use beam-forming to transmit to UEs scattered randomly through its coverage area, which may cause less interference to UEs in neighboring cells than an eNB transmitting through a single antenna to all its UEs.

An eNB, such as eNB 100, may be a fixed station used for communicating with the UEs and may also be referred to as an access point, a Node B, or some other equivalent terminology. In some system configurations, such as heterogeneous networks, the base station or eNB may be one of a variety of types and/or power levels. For example, the eNB may be associated with a macrocell, femtocell, picocell, and/or other type of cell. The eNB may be one of a range of different power levels, such as one of a type of macrocell eNB having any of a range of power levels.

A user terminal or UE may also be denoted as an access terminal, AT, user equipment, wireless communication device, terminal, or some other equivalent terminology. A user terminal may be implemented in the form of a wireless handset, computer or wireless module or device for use with a computer, personal digital assistant (PDA), tablet computer or device, or via any other similar or equivalent device or system.

Figure 2:
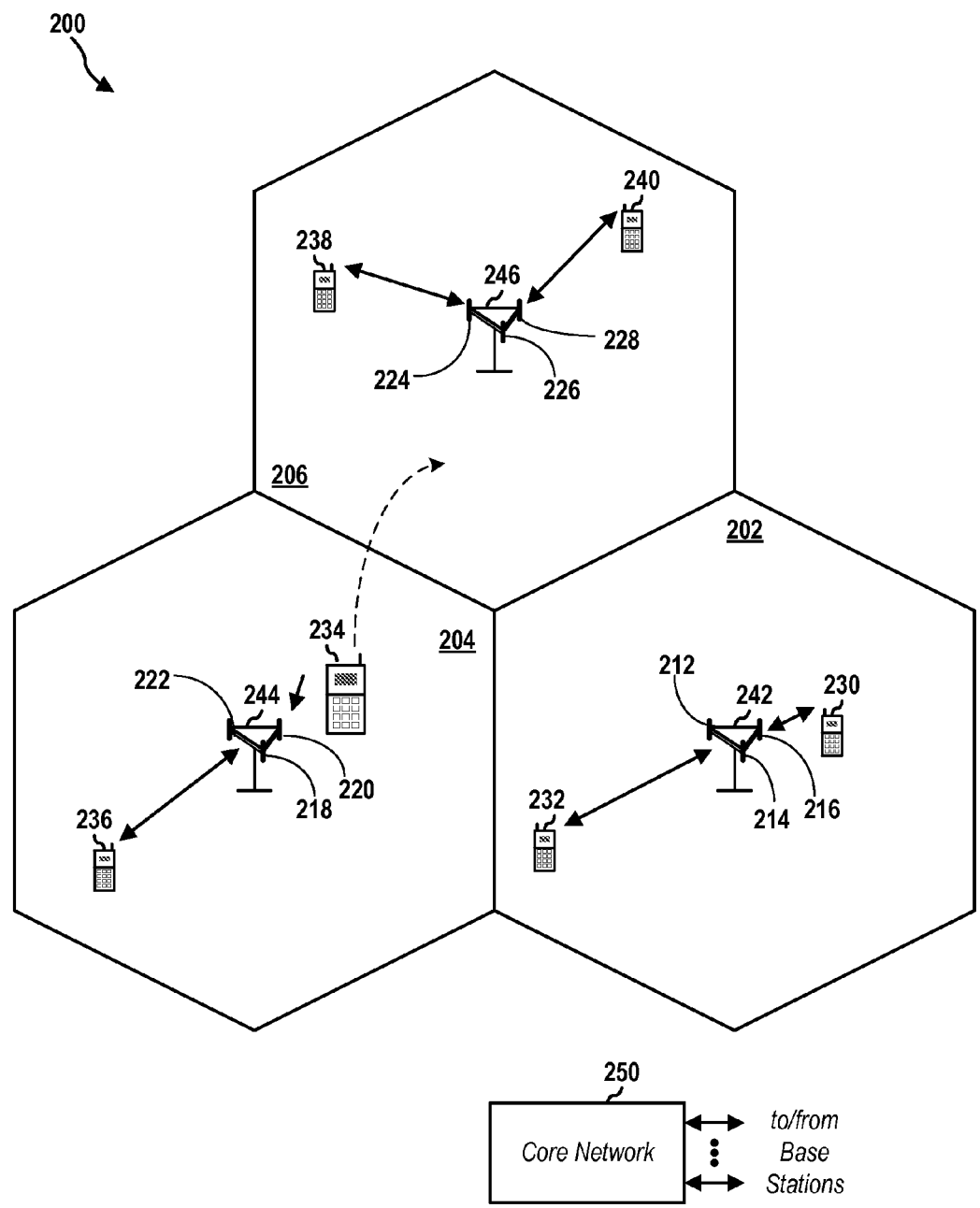
FIG. 2 illustrates a wireless communications system having multiple cells.

Referring now to FIG. 2, which illustrates details of a wireless communication network 200, such as an LTE network. Wireless network 200 may include a number of base stations or evolved Node Bs (eNBs) as well as other network entities. An eNB may be a base station that communicates with user terminals or UEs and may also be referred to as Node B, access point, AP, etc. Each base station or eNB may provide communication coverage for a particular geographic coverage area and/or time and/or frequency-multiplexed coverage area.

In FIG. 2, example communication network 200 includes cells 202, 204, and 206, which each have associated base stations or eNBs 242, 244, and 246, respectively. While cells 202, 204, and 206 are shown adjacent to each other, the coverage area of these cells and associated eNBs may overlap and/or be contiguous with each other. For example, an eNB, such as eNBs 242, 244, and 246 may provide communication coverage for a macro cell, a picocell, a femtocell, and/or other types of cell. A macrocell may cover a relatively large geographic area (e.g., several kilometers in radius) and may allow unrestricted access by UEs with service subscription. A picocell may cover a relatively small geographic area, may overlap with one or more macrocells, and/or may allow unrestricted access by UEs with service subscription. Likewise, a femtocell may cover a relatively small geographic area (e.g., a home), may overlap with a macrocell and/or picocell, and/or may allow restricted access only to UEs having association with the femtocell, e.g., UEs for users in the home, UEs for users subscribing to a special service plan, etc. An eNB for a macrocell may be referred to as a macro eNB or macro base station or macrocell node. An eNB for a picocell may be referred to as a pico eNB, pico base station or picocell node. An eNB for a femtocell may be referred to as a femto eNB, home eNB, femto base station or femtocell node.

A network controller element 250 may couple to a set of eNBs and provide coordination and control for these eNBs. Network controller 250 may be a single network entity or a collection of network entities. Network controller 250 may communicate with eNBs 242, 244, and 246 via a backhaul connection to a core network (CN) function. eNBs 242, 244, and 246 may also communicate with one another, e.g., directly or indirectly via wireless or wireline backhaul.

In some implementations, wireless network 200 may be a homogeneous network that includes only macro base stations or eNBs. Wireless network 200 may also be a heterogeneous network or hetnet that includes eNBs of different types, e.g., macro eNBs, pico eNBs, femto eNBs, relay nodes (RNs), etc. These different types of eNBs may have different transmit power levels, different coverage areas, and different impact on interference in wireless network 200.

For example, macro eNBs may have a high transmit power level (e.g., 20 Watts) whereas pico eNBs, femto eNBs, and relays may have a lower transmit power level (e.g., 1 Watt). The various techniques and aspects described herein may be used in different implementations for homogeneous and heterogeneous networks.

Network 200 may include one or more user terminals or UEs. For example, network 200 may include UEs 230, 232, 234, 236, 238 and 240 (and/or other UEs not shown). The various UEs may be dispersed throughout wireless network 200, and each UE may be stationary, mobile, or both. A UE may also be referred to as a terminal, a mobile station, a subscriber unit, a station, etc. For example, a UE may be a cellular phone, a personal digital assistant (PDA), a wireless modem, a wireless communication device, a handheld device, a laptop computer, a cordless phone, a wireless local loop (WLL) station, a pad or table device, etc. As described previously, a UE may communicate with an eNB via a downlink (DL) and an uplink (UL). The downlink (or forward link) refers to the communication link from the eNB to the UE, and the uplink (or reverse link) refers to the communication link from the UE to the eNB. A UE may be able to communicate with macro eNBs, pico eNBs, femto eNBs, relay nodes, and/or other types of eNBs. In FIG. 2, a solid line with double arrows indicates desired transmissions between a UE and a serving eNB, which is an eNB designated to serve the UE on the downlink and/or uplink. UEs, such as those shown in FIG. 2, may create interference with each other and/or may receive interference from the various base stations or eNBs. Alternately, or in addition, UEs may move from a connection with one base station to another base station, such as due to UE mobility, interference, loading, etc. As noted previously, communications between base stations may be done directly and/or in conjunction with a backhaul network. For example, communications between base stations may be done in conjunction with establishing new connections such as during forward handovers, in the event of radio link failure, or during other events such as cell overloading, transition to other network types, etc. Various aspects related to improving connection transfers and handover performance are described subsequently herein.

Figure 3:
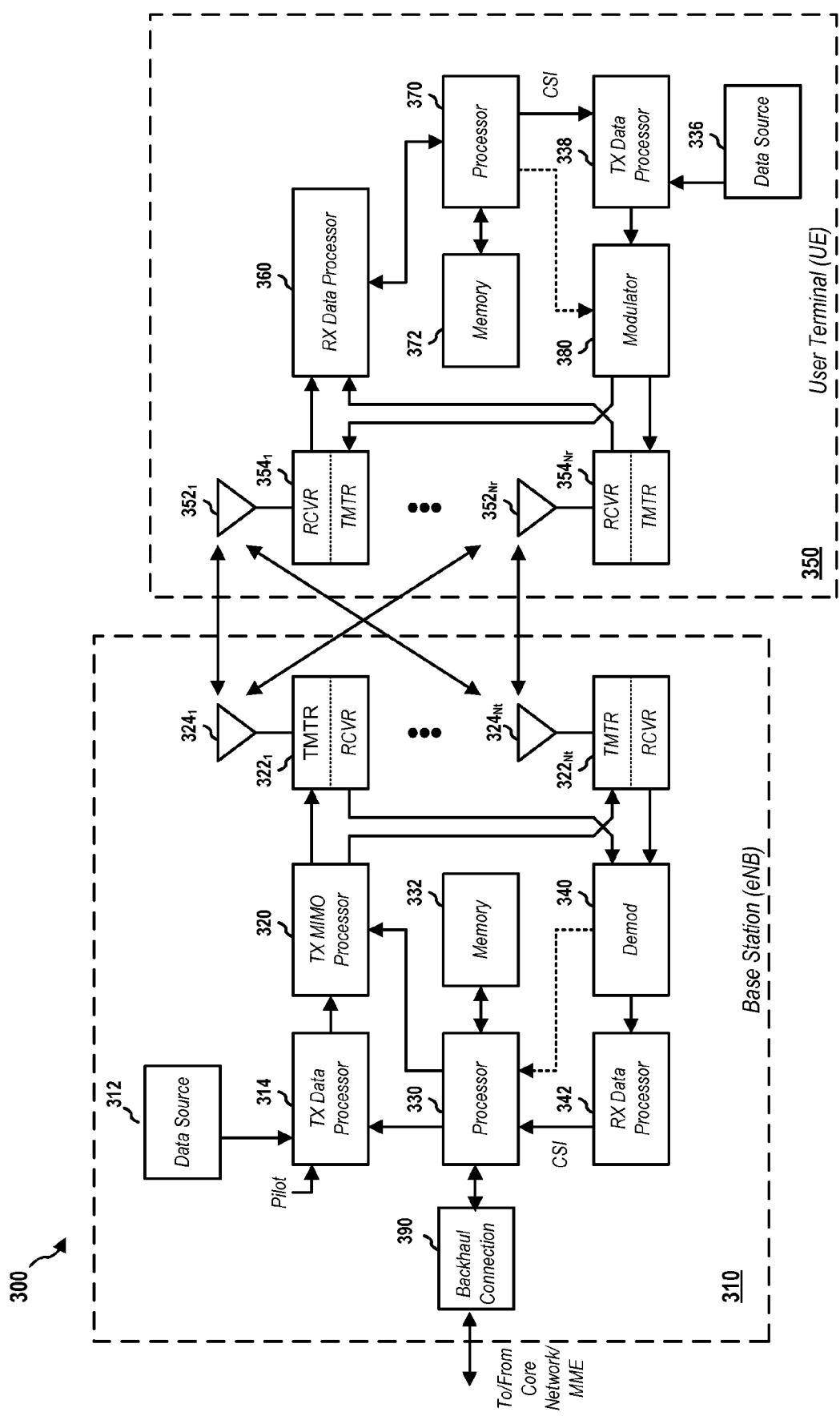
FIG. 3 illustrates an embodiment of a base station and user terminal in a wireless communication system.

Referring now to FIG. 3, which illustrates a block diagram of an embodiment of base station 310 (i.e., an eNB, HeNB, etc.) and a user terminal 350 (i.e., a UE, terminal, AT etc.) in an example LTE communication system 300, on which aspects and functionality as described subsequently herein related to contention-based (CB) and scheduled uplink scheduling and signaling may be implemented. In particular, base station 310 and UE 350 may be configured to perform the contention-based uplink access procedures and functions described subsequently herein, including in FIGS. 6-11. eNB 350 and UE 310 may correspond with, for example, the base stations and user terminals shown in FIGS. 5, 12, and 13.

Various functions may be performed in the processors and memories as shown in base station 310 (and/or in other components not shown), such as communications with other base stations (not shown) of other cells and/or networks, to transmit and receive scheduled and contention-based signaling from the other base stations and UEs, as well as to provide other functionality as described herein.

UE 350 may include one or more modules to receive signals from base station 310 and/or other base stations (not shown, such as non-serving base stations or base stations of other network types as described previously herein) to access base stations, receive DL signals, received broadcast signals, receive grants including information related to contention-based channel access, resources and signaling, receive state information, determine transmission probabilities, which may be based on the state information, determine channel characteristics, perform channel estimates, demodulate received data and generate spatial information, determine power level information, and/or determine or generate other information.

In one embodiment, base station 310 may include a scheduling module configured to determine contention-based access information and transmit the information to one or more served user terminals, such as UE 350. In addition, base station 310 may include a receiver module configured to receive and process both scheduled and CB transmissions. This may be done in one or more components (or other components not shown) of base station 310, such as processors 314, 330 and memory 332.

Base station 310 may also include a transmit module including one or more components (or other components not shown) of eNB 310, such as transmit modules 322. Base station 310 may include an interference cancellation module including one or more components (or other components not shown), such as processors 330, 342, demodulator module 340, and memory 332 to provide functionality such as redirection of served UEs, communication with associated MMEs, or other network nodes, signaling CB information such as state information, grants, controlling UE access to CB resources, providing handover and context information, and/or other information or data such as is described herein.

Figure 4:
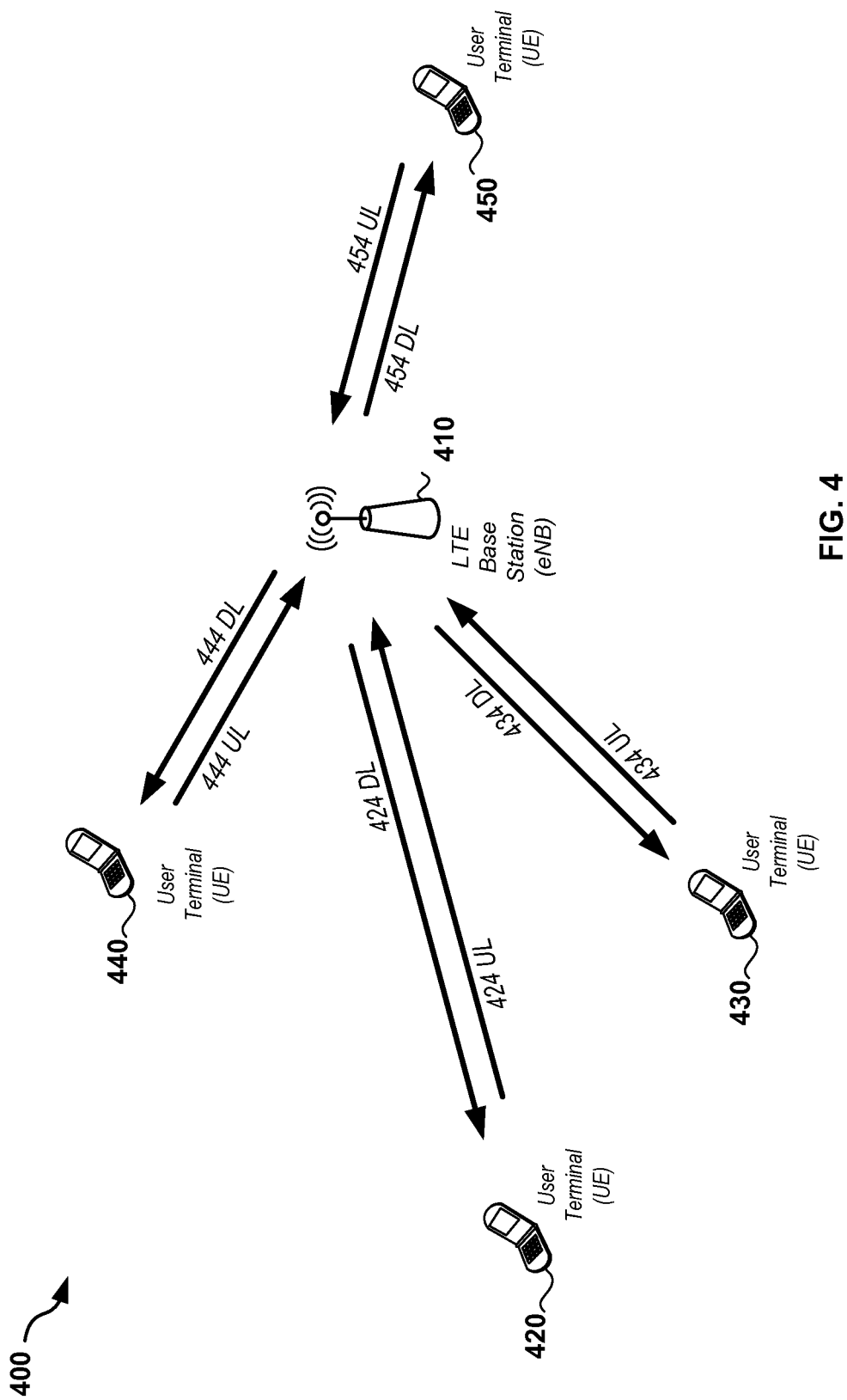
FIG. 4 illustrates scheduled signaling in an example wireless communication system.

Base station 310 may include a processor module including one or more components (or other components not shown), such as processors 330, 314 and memory 332 to perform base station functions as described herein and/or manage transmitter and/or receiver modules, which may be used to communicate with UEs or other nodes, such as other base stations, MMEs, etc. Base station 310 may also include a control module for controlling receiver functionality. Base station 310 may include a network connection module 390 to provide networking with other systems, such as backhaul systems in the core network (CN), as well as other base stations/eNBs, such as via module 390, or with other components such as are shown in FIGS. 1-2, and 4.

Likewise, UE 350 may include a receive module including one or more components of UE 350 (or other components not shown), such as receivers 354. UE 350 may also include a processor module including one or more components (or other components not shown) of UE 350, such as processors 360 and 370, and memory 372, to perform the contention-based processing and transmission functions associated with user terminals as described subsequently herein. This may include, for example, initiating new connections/handovers, declaring failures, such as RLF, performing access procedures, determining transmission probabilities, managing CB resource transmissions, etc.

In one embodiment, one or more signals received at UE 350 are processed to receive DL signals and/or extract information such as MIB and SIB information from the DL signals. Additional processing may include estimating channel characteristics, power information, spatial information, and/or other information associated with eNBs, such as base station 310 and/or other base stations, such as Node Bs (not shown), facilitating redirection commands, searching for and locating redirection targets and alternate targets, such as fallback targets, as well as facilitating communicating with other cells or networks and associated nodes, such as base stations or Node Bs of those different networks.

Memory 332 (and/or other memories of base station 310 that are not shown in FIG. 3) may be used to store computer code for execution on one or more processors, such as processors 314, 320, 330, and 342 (and/or other processors of base station 310 that are not shown) to implement processes associated with the aspects and functionality described herein, and in particular with regard to FIGS. 6-11. Likewise, memory 372 (and/or other memories of user terminal 350 that are not shown) may be used to store computer code for execution on one or more or more processors, such as processors 338, 360, and 370 to implement processes associated with the aspects and functionality described herein. The memories may be used, for example, to store information such as context information, cell and user terminal identity information, as well as other information associated with wireless device and system operation.

In operation, at the base station 310, traffic data for a number of data streams may be provided from a data source 312 to a transmit (TX) data processor 314, where the data may be processed and transmitted to one or more UEs 350. In one aspect, each data stream is processed and transmitted over a respective transmitter sub-system (shown as transmitters $322_1$-$322_{Nt}$ and antennas $324_1$-$324_{Nt}$) of base station 310. TX data processor 314 receives, formats, codes, and interleaves the traffic data for each data stream based on a particular coding scheme selected for that data stream so as to provide coded data. In particular, base station 310 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 314 as shown in FIG. 3 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 330 based on instructions stored in memory 332, or in other memory or instruction storage media of UE 350 (not shown).

The modulation symbols for all data streams may then be provided to a TX MIMO processor 320, which may further process the modulation symbols (e.g., for OFDM implementation). TX MIMO processor 320 may then provide Nt modulation symbol streams to Nt transmitters (TMTR) $\mathbf{322}_1$ through $\mathbf{322}_{Nt}$. The various symbols may be mapped to associated RBs for transmission.

TX MIMO processor 320 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose ($[b_1 \ b_2 \ldots b_{Nt}]$) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as $B_1x_1+B_2x_2+B_{Ns}x_{Ns}$, where Ns beams are transmitted and $x_i$ is the modulation symbol sent using beam $B_i$. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $\mathbf{322}_1$ through $\mathbf{322}_{Nt}$ receives and processes a respective symbol stream to provide one or more analog signals, and further conditions (e.g., amplifies, filters, and upconverts) the analog signals to provide a modulated signal suitable for transmission over the MIMO channel. Nt modulated signals from transmitters 3221 through 322Nt are then transmitted from Nt antennas 3241 through 324Nt, respectively.

At UE 350, the transmitted modulated signals are received by Nr antennas $\mathbf{352}_1$ through $\mathbf{352}_{Nr}$ and the received signal from each antenna 352 is provided to a respective receiver (RCVR) $\mathbf{354}_1$ through $\mathbf{352}_{Nr}$. Each receiver 354 conditions (e.g., filters, amplifies and downconverts) a respective received signal, digitizes the conditioned signal to provide samples, and further processes the samples to provide a corresponding "received" symbol stream.

An RX data processor 360 then receives and processes the Nr received symbol streams from Nr receivers $\mathbf{354}_1$ through $\mathbf{352}_{Nr}$ based on a particular receiver processing technique so as to provide Ns "detected" symbol streams so at to provide estimates of the Ns transmitted symbol streams. The RX data processor 360 then demodulates, deinterleaves, and decodes each detected symbol stream to recover the traffic data for the data stream. The processing by RX data processor 360 is typically complementary to that performed by TX MIMO processor 320 and TX data processor 314 in base station 310.

A processor 370 may periodically determine a precoding matrix. Processor 370 may then formulate a reverse link message that may include a matrix index portion and a rank value portion. In various aspects, the reverse link message may include various types of information regarding the communication link and/or the received data stream. The reverse link message may then be processed by a TX data processor 338, which may also receive traffic data for a number of data streams from a data source 336 which may then be modulated by a modulator 380, conditioned by transmitters $\mathbf{354}_1$ through $\mathbf{354}_{Nr}$, and transmitted back to base station 310. Information transmitted back to base station 310 may include power level and/or spatial information for providing beamforming to mitigate interference from base station 310.

At base station 310, the modulated signals from UE 350 are received by antennas 324, conditioned by receivers 322, demodulated by a demodulator 340, and processed by a RX data processor 342 to extract the message transmitted by UE 350. Processor 330 may then determine which pre-coding matrix to use for determining beamforming weights, and then processes the extracted message.

Some communications system such as LTE systems are scheduled systems where transmissions are generally scheduled by a particular controlling node. For example, in LTE systems, a base station or eNB typically handles scheduling as part of a Media Access Control (MAC) function. The scheduler distributes available system resources, such as resource blocks, among user terminals such as UEs, and among radio bearers (RBs) of each UE. To do this, the base station allocated uplink and/or downlink system resources to each UE based on information such as data buffered in memory in the base station and Buffer Status Reports (BSRs) received from the UE. In this way, the eNB considers the QoS requirements of each configured radio bearer and selects the size of the MAC Protocol Data Unit (PDU).

Scheduling is typically done through dynamic scheduling by means of downlink assignment messages for the allocation of downlink transmission resources and uplink grant messages for the allocation of uplink transmission resources. The uplink grant messages are normally only valid for specific user terminals in specific subframes. This information is transmitted on the Physical Downlink Control Channel (PDCCH) using a Cell Radio Network Temporary Identifier (C-RNTI) to identify the intended UE, and is efficient for some traffic types, such as TCP or Signaling Radio Bearers (SRBs) where traffic is bursty and dynamic.

Scheduling may also be done semi-persistently, where radio resources may be semi-statically configured and allocated to a particular UE for a longer time period that one subframe, avoiding the need for downlink assignment messages or uplink grant messages for each subframe (thereby reducing overhead). This approach is generally only useful where resource requirements are predictable, such as for Voice Over IP (VOIP).

Referring now to FIG. 4, illustrated is an example communications system 400, which may be an LTE system. System 400 includes a serving base station, eNB 410, as well as four served user terminals or UEs 420, 430, 440, and 450. Each UE may have an established connection with serving base station 410, and may communicate, in a scheduled fashion as described previously, using a scheduled uplink transmission. For example, UE 420 may send scheduled uplink grant information on UL 424, and may receive downlink data and control information on DL 424. Similarly, UEs 430, 440, and 450 may receive and send scheduled signaling on DL/UL channels 434, 444, and 454. In this way, signaling is generally fully scheduled (with the possible exception of Random Access Procedures (RACH) during initial network or cell access, etc.).

However, as noted previously, it may be desirable to provide an alternate access mechanism, in particular for uplink transmissions from the user terminals to the base station. For example, as noted previously, it may be desirable to reduce user plane latency (for example, the time between transmission of a data packet and reception of a physical layer acknowledgment (ACK)).

Many users operating on data-oriented networks such as LTE are sending thin-stream data (short data sessions at random intervals, typically occurring infrequently). When a cell has many user terminals and their associated users are sending thin stream data, substantial network overhead may occur. For example, scheduling for potentially thousands of links between user terminals and a serving base station may become very complex. In addition, control signaling and overhead for large number of connections may increase individual and/or overall network latency, potentially substantially.

In accordance with various aspects, latency may be reduced by providing Contention-Based (CB) transmissions on the uplink (e.g., for data transmissions from one or more UEs to a serving eNB). CB transmissions are transmissions that not scheduled as is normally done in systems such as LTE systems. In a contention-based implementation, one or more user terminals are provided with common or shared resources and can each transmit data packets in those common resources within the same time interval. This approach can reduce latency, particularly when shared loading is not too large. Moreover, in the case of scheduled systems such as LTE, use of contention-based uplink access can improve overall performance by reducing control channel scheduling-related overhead, such as for thin stream data, by reducing use of control signaling and control channel resources. In addition, use of contention-based uplink access may improve delays experiences by thin-stream traffic relative to non-contention-based access (e.g., using, for example, PUSCH in LTE implementations).

Contention-based protocols have been described in the art. For example, the Aloha protocol has been used since the early 1970s for shared random access. However, some protocols, such as the Aloha protocol, are not stable. With a stable protocol as the loading increases the throughput increases or at least stays flat (a profile that stays flat above a certain throughput is technically considered as unstable, however, it may also be used in some implementations since it maintains throughput constant as opposed to dropping throughput as loading increases). In an unstable protocol, such as ALOHA, the throughput decreases above a certain load, and may go to close to zero as loading further increases. In an exemplary implementation, a CB protocol should be stable or at least maintain throughput to avoid throughput decrease as loading increases.

Stable protocols have been described in the art for CDMA systems. However, unlike a CDMA system, LTE and similar systems are designed inherently to be scheduled, as described previously. Therefore, they do not contemplate use of contention-based uplink transmission, since it is assumed that uplink transmissions from the UEs will always be scheduled by the eNB. However, in accordance with various aspects, a scheduled system, such as an LTE system, may potentially be enhanced by employing contention-based uplink transmission in addition to scheduled transmissions. The contention-based transmissions may be based on parameters such as overall loading, subchannel loading, total system bandwidth, overhead, channel quality or other channel characteristics, number of users, number of thin messages and/or type of associated users, QoS requirements, and/or other system or device criteria.

In an exemplary embodiment, a base station such as an eNB in an LTE system may allocate a subset of system resources (e.g., a subband of the total available bandwith, a subset of time-frequency resources, etc.) to contention-based uplink transmissions. In addition to LTE systems, the various aspects related to contention-based scheduling may also be applied to other scheduled systems wherein a subset of resources may be allocated to contention-based uplink access, such as Wi-Max or other systems.

Contention-based scheduling may be done at the base station based on criteria such as those described above (e.g., overall loading, subchannel loading, total system bandwidth, overhead, channel quality or other channel characteristics, number of users, number of thin messages and/or type of associated users, QoS requirements, and/or other system or device criteria). The remaining system resources may then be used by the base station for normal scheduled transmissions, such as scheduled uplink transmissions.

Figure 5:
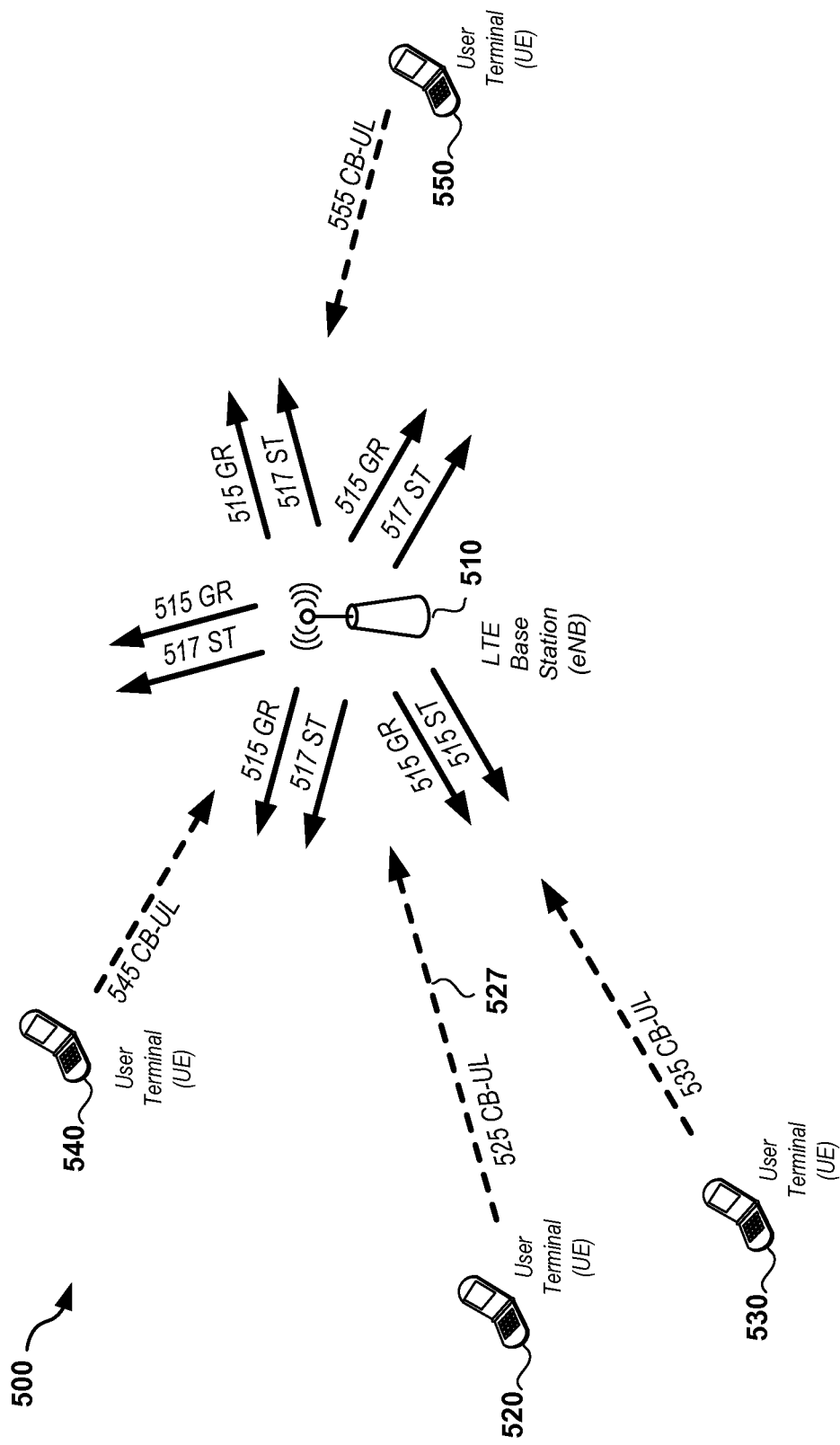
FIG. 5 illustrates an embodiment of contention-based signaling in a wireless communication system.

Referring now to FIG. 5, illustrated is an example communication system 500, which may be the same as or analogous to system 400 of FIG. 4. System 500 may implement the scheduled access mechanism described with respect to System 400 (e.g., uplink transmissions scheduled for each UE and allocated on DL control signaling). However, system 500 may further employ a contention-based uplink transmission mechanism in addition to scheduled uplink transmission as shown in FIG. 4.

For example, base station eNB 510 may be configured to generate contention-based grant information, such as information defining which subset of system resources are to be used for contention-based transmissions, the Modulation and Coding Scheme (MCS) to be used, spreading information, and/or other information related to allocation of the subset of system resources for contention-based uplink access.

The contention-based grant information may be signaled via DL signaling 515 GR. For example, the grant information (GR) may be sent via a broadcast transmission, with the grant information included in, for example, an Information Element (IE) in a System Information Broadcast (SIB), and/or via other broadcast control signaling. Alternately, or in addition, the grant information may be sent to specific UEs via a control channel, such as the Physical Downlink Control Channel (PDCCH). In this way, grant information may be tailored, in whole or part, for specific UEs. In some cases, only a subset of the total number of served UEs may be assigned to use the CB uplink resources. For example, eNB 510 may monitor uplink traffic and make a determination, based on a particular uplink traffic metric, that a subset of the UEs (for example, UEs sending mostly thin traffic, a particular quantity of thin traffic, etc.) should be able to access the CB uplink resources, and other UEs may not. Alternately, or in addition, two or more subset of UEs may be allocated with different subset of system resources for contention-based uplink access. Alternately, or in addition, UEs may be assigned different parameters for use of the one or more CB subset of resources. For example, different UEs may be assigned different access parameters, such as transmission probabilities (as described subsequently herein), to facilitate criteria such as different QoS.

eNBs may also configure certain logical channels or Logical Channel Groups (LCGs) at the UE to use the CB uplink resources, depending, for example, on QoS requirements such as, for example, packet delay. Furthermore, rules may be configured at the UE that allow contending for the CB uplink when no grant has been received for the non-contention-based uplink in a particular subframe.

In addition to contention-based grant information, eNB 510 may also generate and send state information, such as is described subsequently herein. The state information may be signaled via DL signaling 517 ST. As with the grant information, the state information may be signaled via broadcast signaling, PDCCH, both, and/or via other signaling mechanisms.

Having received the grant and state information, one or more of UEs 520, 530, 540, and 550 may then generate and send, based on the grant and state information, contention-based (CB-UL) uplink transmissions (shown as dashed lines). As shown in FIG. 5, eNB 510 may receive one or more of UL signals 525, 535, 545, and 555 within the allocated subset of system resources, which may collide, and may then decode one or more of the messages. As is known in the art, in the event of collision, various mechanisms can be employed to decode one or more of the colliding messages. In some cases, for example, if the colliding messages are received at the same time at approximately the same power level, they may both be lost, however, it may be able to recover one or more messages in the event of collision in some cases.

If CB uplink transmission is successfully received, eNB 510 may send an ACK, such as using the Physical Hybrid ARQ Indicator Channel (PHICH).

Figure 6:
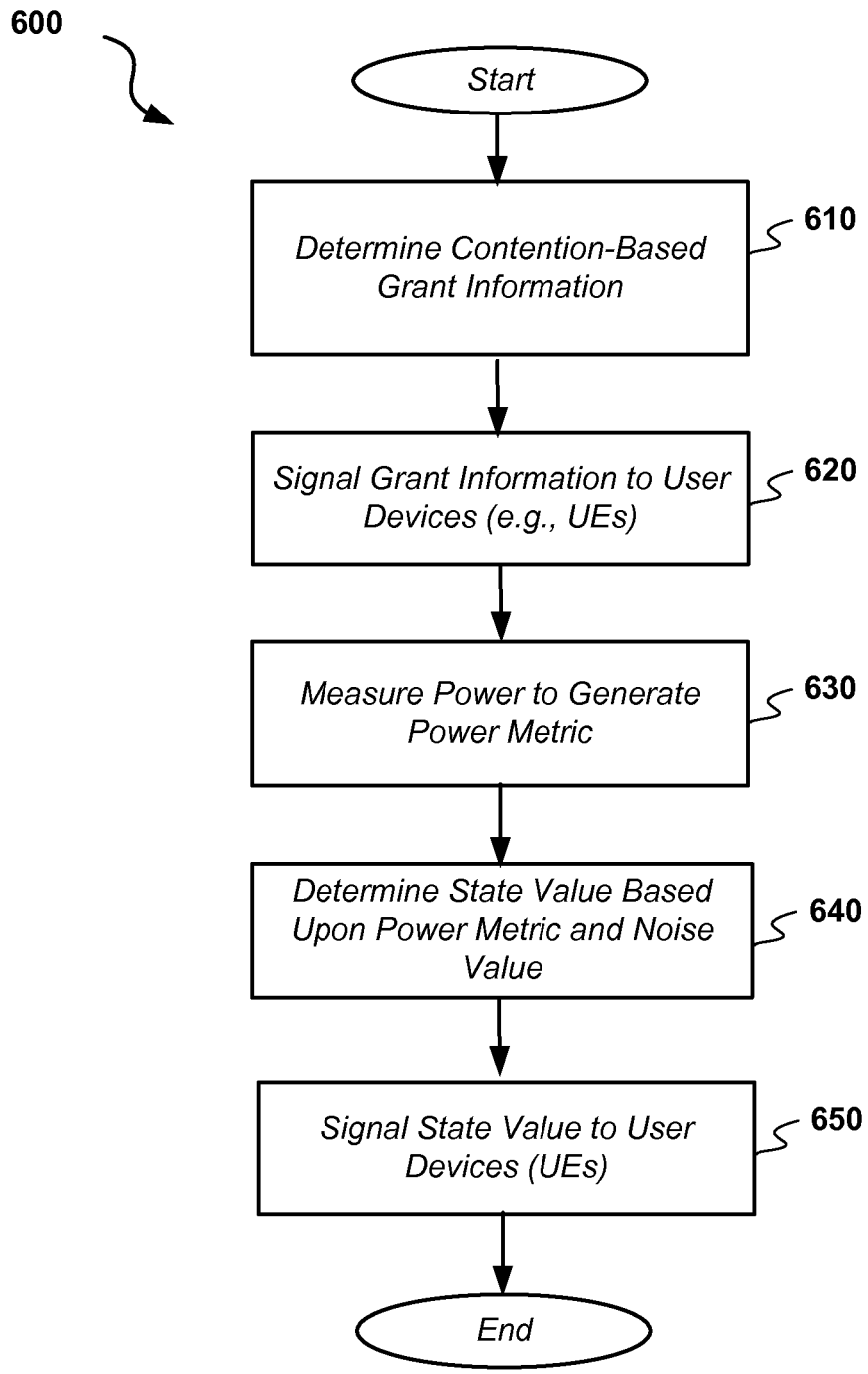
FIG. 6 illustrates an embodiment of a process for providing grant and state information for implementing contention-based uplink access in a wireless communication system.

Referring now to FIG. 6, illustrated is an embodiment of a process 600 for use in providing contention-based information. The information may be provided from a base station, such as an eNB, to a plurality of user terminals, such as UEs, such as shown in FIG. 5. At stage 610, contention-based grant information, including information allocating a subset of system resources for contention-based access may be generated. At stage 620, the contention-based grant information may be signaled to one or more user devices, such as UEs. At stage 630, a first set of contention-based uplink transmissions received during a first uplink transmission period may be measured. The measurement may be used to generate a power metric. At stage 640, a state value may be determined based on the power metric and a noise metric. At stage 650, the state value may be signaled to the one or more user devices. The signaled state value may be usable by the one or more user devices in scheduling of a second set of contention-based uplink transmissions in the subset of system resources during a second uplink transmission period.

The allocation of a subset of system resources may be based, for example, at least in part on non-contention-based uplink loading at the base station. The allocation of a subset of system resources may be based at least in part on the number of user devices served by the LTE base station. The allocation of a subset of system resources may be based at least in part on a predefined proportion of the total system bandwidth. The allocation of bandwidth may be based on parameters or characteristics such as a number of devices or Logical Channel Groups (LGCs) determined to be served more efficiently using contention-based uplink access. The allocation of bandwidth may be based on the latency targets and/or expected or predicted data rates of traffic on the LGCs. The allocation of a subset of system resources may be specific to a subset of UEs being served by the base station. For example, a first subset of UEs may be allocated one subset of system resources and a second (and/or addition) subsets may be allocated a different subset of system resources.

The subset of system resources may include, for example, a sub-band of the total system bandwidth. The sub-band may be allocated exclusively for contention-based uplink access. Alternately, the sub-band may be allocated for shared contention-based and non-contention-based transmissions. The subset of system resources may include a subset of available time-frequency system resources. The time-frequency resources may be allocated exclusively for contention-based access. The subset of system resources may be semi-statically allocated. Alternately, or in addition, the subset of system resources may be dynamically allocated.

The contention-based grant information may further include, for example, Modulation and Coding Scheme (MCS) information. The contention-based grant information may further include spreading code information usable by the one or more user devices to spread data within the uplink transmission periods. The spreading code information may include information defining a plurality of spreading code sequences. The spreading code sequences may be Zadoff-Chu sequences The stage of determining a state value may include, for example, computing a ratio of the power metric to the background noise metric. The power metric may be based on a total power associated with the contention-based uplink transmissions and the background noise metric may be based on a total background noise in the subset of system resources. Other metrics, such as interference metrics, may also be used in determining the state value. The state value may be a non-negative integer value based on the ratio.

The stage of determining a state value may further include decrementing a previous state value if the ratio is less than a predefined threshold value. The stage of determining a state value may include incrementing a previous state value if the ratio is not less than a defined threshold value. The incrementing and decrementing may be symmetric, wherein equal values are applied to incrementing and decrementing. Alternately, the incrementing and decrementing may be non-symmetric, where different values are applied to the incrementing and decrementing.

The stage of signaling contention-based grant information may include, for example, sending the contention-based grant information using a downlink control channel, such as the Physical Downlink Control Channel (PDCCH). Alternately, or in addition, the stage of signaling the contention-based grant information may include signaling the contention-based grant information using a system broadcast channel. The stage of signaling a state value may include sending the state value over a downlink control channel, such as the Physical Downlink Control Channel (PDCCH) in an LTE system. The stage of signaling a state value may include sending the state value using a system broadcast channel.

The process 600 may further include, for example, determining another or second set of contention-based grant information including allocating a second subset of system resources for contention-based access. The second subset of system resources may be different from the subset of system resources. The process may further include signaling the second contention-based grant information to the one or more user devices.

The process 600 may further include, for example, receiving, from one of the one or more user devices, a first contention-based uplink transmission consistent with the contention-based grant information. The process may further include receiving, from the one of the one or more user devices, a non-contention-based scheduled uplink transmission, such as a normal scheduled UE uplink transmission. The process may include receiving, from a second of the one or more user devices, a second contention-based uplink transmission. The second contention-based uplink transmission may collide with the first contention-based uplink transmission. The process may further include decoding at least one contention-based uplink transmission, such as the first, second, or both transmissions.

The process 600 may further include, for example, sending, in response to receipt of the first contention-based uplink transmission, a Hybrid ACK/NACK transmission. The ACK/NACK transmission is sent on an acknowledgment channel, such as the Physical Hybrid ARQ Indicator Channel (PHICH) in an LTE system.

The process 600 may further include, for example, determining, based on a characteristic associated with a first of the one or more user devices, to allow the first user device access to the contention-based resources, and authorizing the first user to use the contention-based resources for one or more uplink transmissions. The characteristic may relate to uplink data transmissions from the first user. The uplink characteristics may relate to transmission types and/or frequencies. The uplink characteristics may relate to a QoS requirement. The process may further include determining, based on a characteristic associated with a second of the one or more users, to restrict the second user from access to the contention-based resources, and restricting the second user from the contention-based resources for one or more uplink transmissions. The authorizing and/or restricting may be done based on signalling access information to the second user.

The state value and contention-based grant information may, for example, be signalled to a first subset of the one or more user devices. The first subset may be determined at the base station based at least in part on uplink transmissions from the first subset of devices. The process may further include determining second contention-based grant information including information allocating a second subset of system resources for contention-based access by a second subset of the one or more user devices, and signalling the second contention-based grant information to the second subset of user devices. The process may further include determining a second state value, and signalling the second state value to the second subset of user devices.

Figure 7:
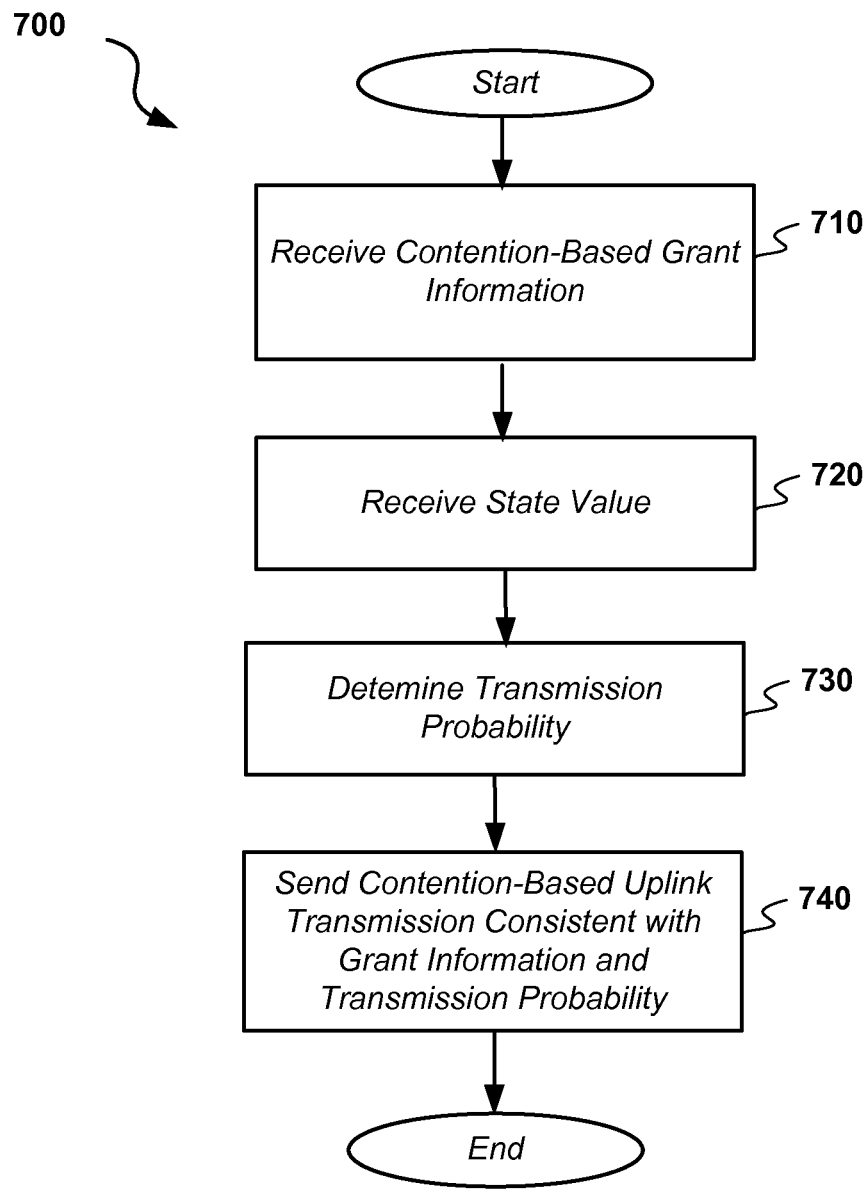
FIG. 7 illustrates an embodiment of a process for sending contention-based uplink transmissions in a wireless communication system.

Referring now to FIG. 7, illustrated is an embodiment of a process 700 for use in providing contention-based transmissions. The contention-based transmissions may be provided from a user terminal, such as a UE, to a base station, such as an eNB, such as is shown in FIG. 5. At stage 710, contention-based grant information may be received from a control and scheduling nod, such as a serving base station, wherein the contention-based grant information includes information allocating a subset of system resources for contention-based access. At stage 720, a state value, which may be determined based upon a power metric and a background noise metric may be received from the base station. The state value may also be based on other parameters, such as an interference metric, etc. Based on the state value, the UE may generate a transmission probability at stage 730. At stage 740, a first contention-based uplink transmission consistent with the contention-based grant information and transmission probability may be sent to the base station.

The subset of system resources may, for example, be semi-statically allocated. Alternately, or in addition, the subset of system resources may be dynamically allocated. The contention-based grant information may include MCS information. The first contention-based uplink transmission may be sent consistent with the received MCS information.

The contention-based grant information may include spreading code information. The first contention-based uplink transmission may be sent consistent with the spreading code information. The spreading code information may include information defining a plurality of spreading code sequences. The process 700 may further include selecting a first spreading code sequence from the plurality of spreading codes, and spreading data within the first contention-based uplink transmission using the first spreading code sequence. The spreading code sequence may be randomly selected. The spreading code sequences may be, for example, Zadoff-Chu sequences.

The stage of sending a first contention-based uplink transmission consistent with the state value may include, for example, determining a transmission probability based on the state value, and sending the uplink transmission consistent with the transmission probability.

The state value may be received from a system broadcast channel. The state value may be received from a control channel, such as the PDCCH in an LTE system. The first contention-based grant may be received from a system broadcast channel. The first contention-based grant may be received from a control channel such as the PDCCH.

The process 700 may further include, for example, receiving, from the base station, an ACK/NACK signal in response to the first uplink transmission.

The process 700 may further include, for example, receiving, from the base station, second contention-based grant information including an allocation of a second subset of system resources for contention-based access, wherein the second subset of system resources is different from the subset of system resources. The method may further include sending, consistent with the second contention-based grant information, a second contention-based uplink transmission.

The process 700 may further include, for example, receiving, from the base station, a second state value, and sending, consistent with the second state value, a second contention-based uplink transmission. For example, the second state value may be used to dynamically reconfigure how one or more UEs content for CB resources. For example, the state value may be used to allow the UEs to dynamically change transmission probability. The state value and associated transmission probability may, for example, be assigned to all CB UEs or may be assigned to a subset of all UEs using contention-based uplink access.

As noted previously, it may be desirable to use a stable protocol so as to avoid throughput decreases above a certain loading level. In general, control of access to the contention-based subset of resources may be controlled by using feedback from the eNB to the UEs to assign or provide a mechanism for generating a transmission probability, $P_t$ ($0 \leq P_t \leq 1$) where the UEs then send a CB uplink transmission consistent with the probability $P_t$ (i.e., if $P_t$ is 0.5, the UE sends transmissions 50% of the time, on average). By causing or instructing a UE to use a $P_t$ value of 0, the UE may effectively be prohibited from using CB access. Conversely, by causing or instructing the UE to use a $P_t$ value of 1, the UE may be granted essentially full usage of the CB uplink resources. In order to facilitate efficient distribution of transmission probability information, rather than sending a discrete probability value $P_t$, which may require multiple bits depending on granularity, the eNB may instead send a state value j that may be used to determine the probability $P_t$ at the UE.

For example, in an exemplary embodiment, a stable protocol may be implemented as follows at a base station or eNB. The eNB may maintain state variable, j, which may be defined to be a non-negative integer value. In some cases, more than one subset of system resources may be allocated for contention-based uplink transmission, and in this case, there may be a separate state variable for each subset.

The state variable value may be initialized to zero. At a specific time period (which may be, for example, after each CB uplink transmission), the eNB may then determine a ratio metric, M, based on received power and background noise. For example, the power metric may be a total measured receive power over the allocated CB resources or, alternatively, just interference power may be used. The noise metric may be a measured or calculated or assigned background noise metric.

The ratio M may be generated according to the following:

$$M = \frac{\text{Total } Rx \text{ Power over } CB \text{ resources}}{\text{Background noise power}}$$

The state variable j may then be updated based on the ratio metric as follows:

If M<T, then j=j-1. Otherwise, j=j+1.

Where, a predetermined threshold, T, may be used as a reference for M and step sizes may be symmetric in the up/down direction.

However, in some implementations, different step sizes for up and down may be used. By using different up/down step sizes, the rate at which the eNB opens up or shuts down the number of users accessing CB resources may then be adjusted. For example, in an OFDMA system, it is typically desirable that the probability of one user contending to be very high and the probability of zero users contending to be low. Dynamics of this step up or down are dependent on an eNB controlling those aspects, which may be implemented this way. Different step sizes may also be used with, for example, different QoS classes, etc.

The updated state information (i.e., the current value of the state variable j) may then be sent to the user terminals or UEs, where it may be used to generate the transmit probability, $P_t$, such as described below.

At the user terminal, the state information (e.g., updated value of variable j) may be received, such as via a broadcast transmission or via the PDCCH. Whenever the UE then has a packet to transmit, it may then transmit the packet (in the subset of resources and in accordance with information provided in the CB uplink grant information) with probability $P_t$, where $P_t$ may be generated from j as follows:

$$P_t = P_r^j$$

In this relationship (i.e., where transmission probability is based on a reference Probability $P_r$) the transmission probability $P_t$ is determined at the UE as the reference probability to the power j (i.e., state value). For example, as the received power goes up and M exceeds the threshold, j will also go up, and subsequent transmission probability $P_t$ will go down, thereby reducing potential collisions.

Although this example illustrates one possible stable processing algorithm for controlling transmission probability, it will be apparent that other algorithms, and in particular stable algorithms, may be used in various embodiments. For example, in some implementations, different classes of CB users may be defined and allocated. In this case, each class may be assigned separate parameters, such as different transmission probabilities and/or step values.

Figure 8:
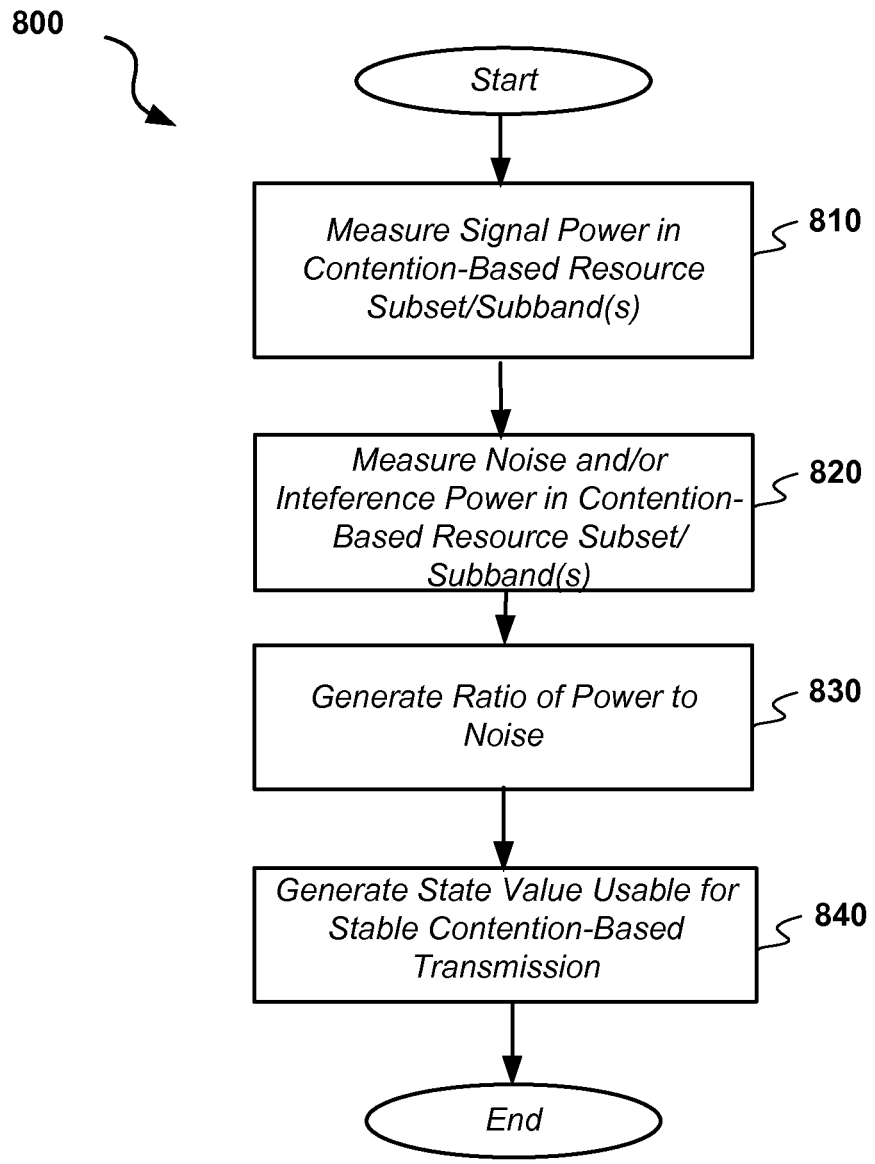
FIG. 8 illustrates an embodiment of a process for determining state information for use in contention-based uplink transmissions in a wireless communication system.

Referring now to FIG. 8, illustrated is an embodiment of a process 800 for determining a state value and transmission probability, such as described previously. At stage 810, signal power within a contention-based resource allocation, such as a subset of available system resources, may be measured. The subset may be, for example, a subband or set of subbands, and/or other time-frequency resources, such as an allocated set of resource blocks (RBs).

At stage 820, noise power may be measured or determined in the subset. In some cases, the noise power may be predefined or assigned to the base station and/or network. At stage 830, a ratio metric may be determined. The ratio may be a ratio of the power metric to the noise metric. In some cases, other processing algorithms accounting for at least signal power and noise may alternately be used, such as, for example, interference power. For example, in one implementation, a ratio may be based on interference power plus transmitted power divided by transmitted power (e.g., (I+T)/T).

At stage 840, a state value may be generated based on the ratio metric. For example, the state value may be generated by comparing the ratio metric to a predetermined threshold value. The state value may then be sent to user terminals for use in generating a transmission probability for contention-based uplink transmissions, such as described previously herein.

Figure 9:
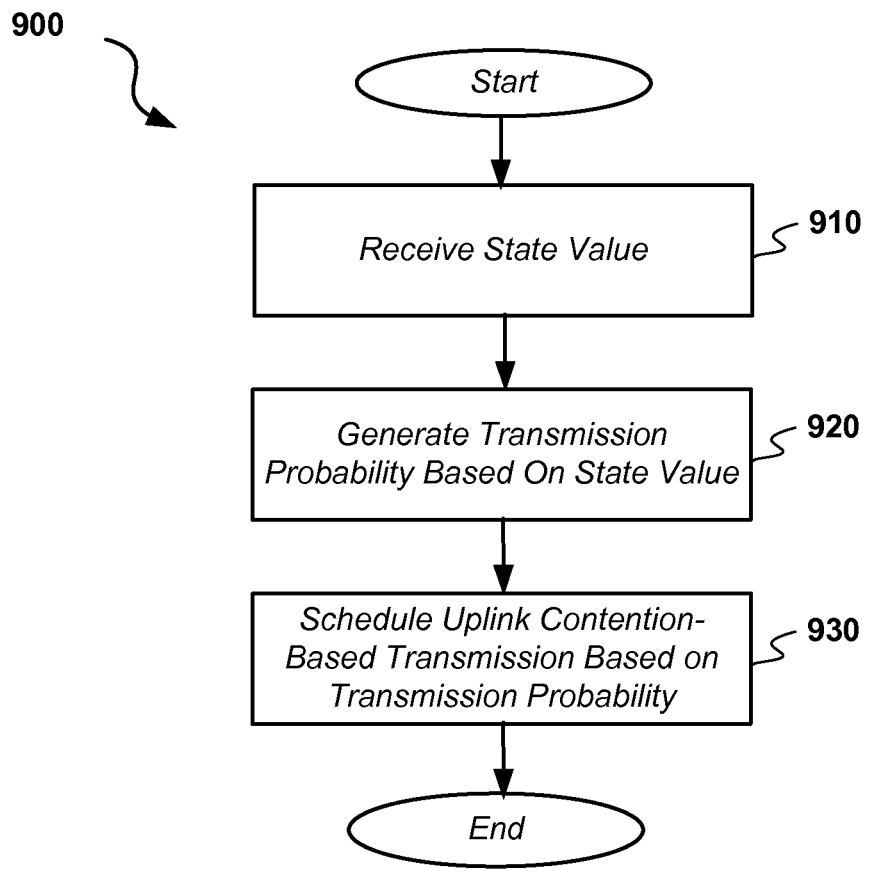
FIG. 9 illustrates an embodiment of a process for generating a contention-based uplink transmission in a wireless communication system.

Referring now to FIG. 9, illustrated is an embodiment of a process 900 for determining a transmission probability for sending contention-based transmissions. At stage 910, a state value may be received, such as at a user terminal for a serving base station. At stage 920 a transmission probability may be generated using the state information. For example, the transmission probability may be generated by applying the state value to a reference probability. The reference probability may be received by the base station in, for example, an Operation, Administrative, and Maintenance (OA&M) function, or during operation, such as on a downlink control channel or broadcast transmission.

In an exemplary embodiment, the transmission probability may be generated by raising the reference probability to a power of the state value. For example, if the reference probability is 0.5 and the state value is 1, the transmission probability will be 0.5. If a subsequent state value of 2 is received (indicating increased contention-based loading on the CB uplink resources), the transmission probability will be reduced to 0.25 (i.e., CB transmissions should be sent less frequently).

At stage 930, a contention-based controller function may then use the transmission probability to send a transmission consistent with the transmission probability.

Figure 10:
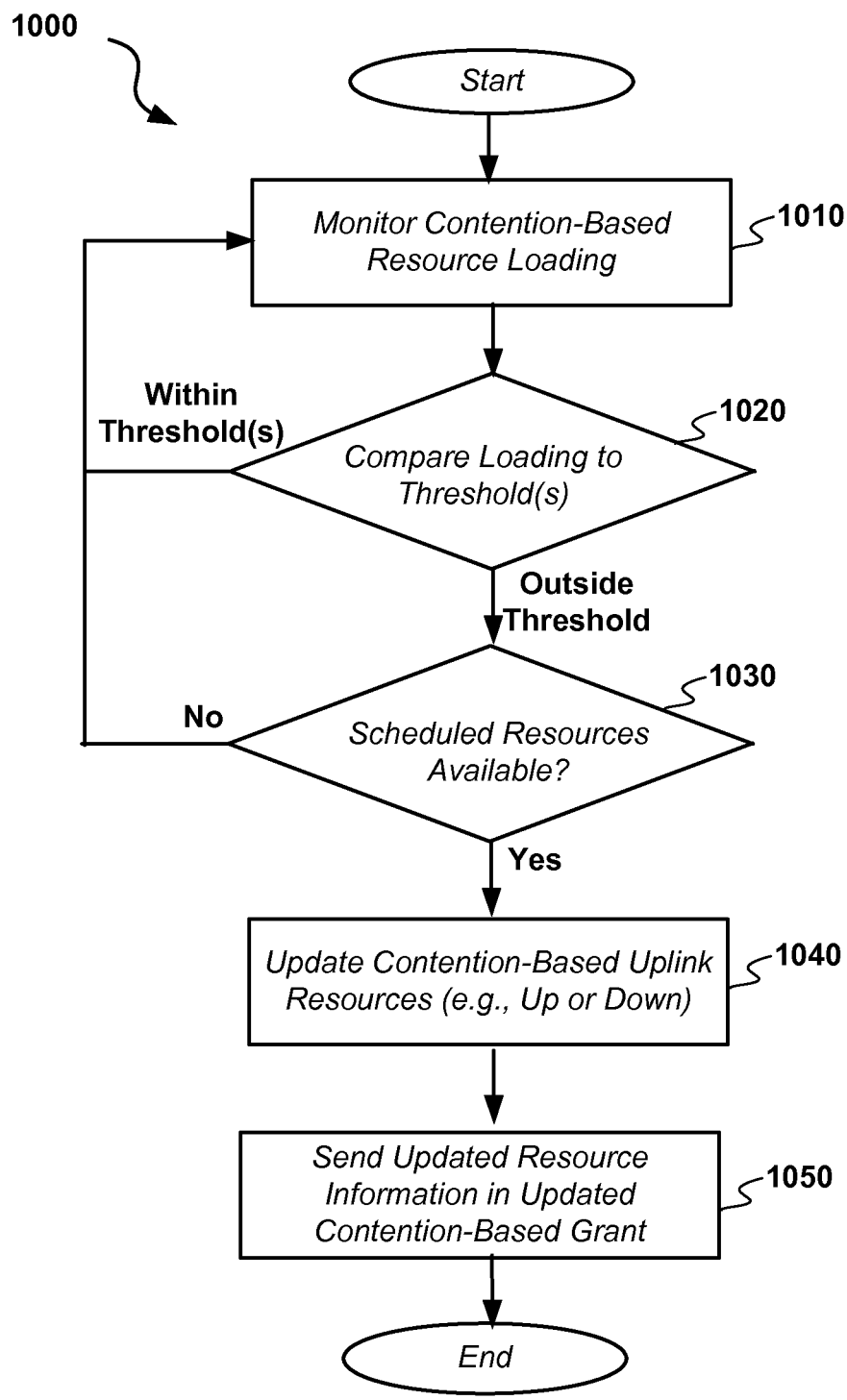
FIG. 10 illustrates an embodiment of a process for reallocating contention-based resources in contention-based uplink transmissions in a wireless communication system.

Referring now to FIG. 10, illustrated is an embodiment of a process 1000, that may be used to reconfigure contention-based uplink resources, such as at base station or eNB. As noted previously, various mechanisms may be used to determine and allocate the subset of system resources for contention-based uplink use. For example, the allocation may be based on criteria such as scheduled transmission loading, CB loading, channel characteristics or conditions, number of users, number of thin transmissions, QoS criteria, such as packet delay, interference, etc. In some cases, an eNB may monitor these conditions (and/or others) and make a dynamic assessment regarding how many resources (e.g., the size and/or number of subbands or other time-frequency resources allocated). The allocation may then change in response to changes in these conditions. In the example process shown in FIG. 10, a loading metric is used to illustrate monitoring and reallocating CB resources, however, other metrics, such as metrics based on criteria such as interference, QoS, channel characteristics, etc. may be used alternately or in addition.

At stage 1010, loading of the CB resources may be monitored. This may be done by, for example, monitoring a state value as described previously herein, and/or by other mechanisms such as are described subsequently herein. At stage 1020, the loading may be compared to one or more threshold values. The threshold values may be predefined, such as part of an OA&M function, and/or may be dynamically adjusted, such as based on channel conditions, interference, etc. If the current resource loading is within the threshold range (for example, below a high threshold and above a low threshold), process 1010 may return to stage 1010.

Alternately, if the current loading is outside the threshold, a determination may be made at stage 1030 as to whether other resources, such as scheduled transmission resources, may be available. For example, if the loading is above a high threshold, a determination may be made as to whether additional scheduled resources may be reallocated as CB resources. Alternately, if the loading is below a low threshold, a determination may be made as to whether some of the CB resources may be reallocated to the subset of scheduled resources.

If reallocation is not available, processing may return to stage 1010. Alternately, at stage 1040, the CB and scheduled resources may be reallocated. For example, if loading on the CB resources is high and on the scheduled resources is low, more scheduled resources may be reallocated as CB resources. Alternately, if more scheduled resources are needed and CB resource loading is low, CB resources may be reallocated as scheduled resources.

At stage 1050, updated contention-based grant information including the updated CB uplink resource allocation may be sent to the user terminals or UE for use in future contention-based uplink transmissions. Additional details of various embodiments of CB and schedule resource allocation are described below.

For example, in one embodiment, resources (e.g. bandwidth or subbands) may be allocated between CB and scheduled usage (e.g., on the PUSCH) as follows.

CB band size maybe adapted by monitoring the delays for served users. If delay becomes too high, then the bandwidth maybe increased, or if a determination is made (such as described subsequently) that some users are better served (e.g. lower delays) by being moved to scheduled resources (PUSCH), then those users may be moved.

In general, Scheduling Request (SR) and Buffer Status Report (BSR) mechanisms may be assumed to be not available for CB resource access, in which case high delays may need to be indicated via MAC control signaling. Alternately, instead of delays, the energy and number of packets decoded may be monitored to estimate the number of collisions. If the number of collisions is high, it will generally mean packets will miss latency targets.

Within the users/logical channels being served in the CB access resources, differentiated service may be provided by setting different probabilities of access (permission probabilities or transmission probabilities (such as described previously)) and/or by assigning different modulation and coding schemes (MCS) to different users (within the same shared CB resources). For example, users with better average channels could use a higher MCS. This may be done via alpha based power control, with alpha set to less than one. Alpha based power control is defined as part of the 3GPP LTE specifications and is a form of fractional power control. As opposed to each user completely inverting the channel, so that they are all received at the same power at the eNB, alpha based power control allows users to invert only a part of their channel gain.

As another example, users with lower delay tolerance could effectively use a higher average permission probability.

This may be accomplished by using a higher constant persistence probability (e.g., $\pi$) or by making the higher delay tolerance users use a larger step size (for example by setting of the exponent in the computed permission probability—for example, increase exponent by a step larger than 1, decrease always by 1).

In accordance with various aspects, in addition to managing CB resource reallocation, in some implementations, the eNB may manage which users (of a plurality of users) are authorized to use the contention-based uplink resources. For example, in a cell where 50 users are being served, the eNB may authorize only a subset (e.g., 10 or 20) of these users to use the CB uplink resources. This may be based on, for example, the reallocation characteristics described above, as well as individual user characteristics. In some cases, both CB user management and CB resource management may both be statically or dynamically applied by the eNB.

Figure 11:
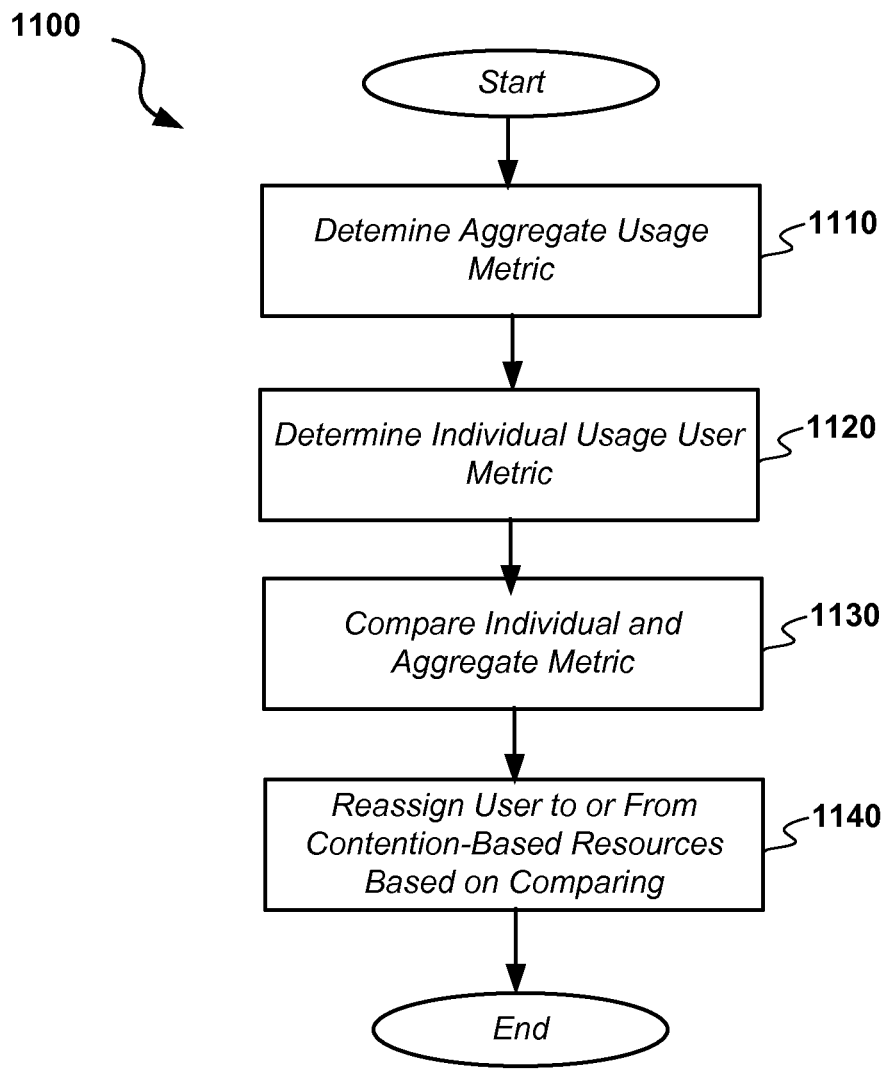
FIG. 11 illustrates an embodiment of a process for reassigning users between scheduled and contention-based uplink resources in a wireless communication system.

User authorization for use of CB uplink resources may be done based, for example, on user data transmission characteristics or other usage metrics. An embodiment of an example process for reallocating users between contention-based and scheduled resources is illustrated in FIG. 11. At stage 1110, an aggregate metric associated with a plurality of users of CB resources, scheduled resources, or both may be determined. At stage 1120, individual metrics for one or more individual users of the plurality of users may be determined. At stage 1130, the individual and aggregate metrics may be compared. At stage 1140, based on the comparing, one or more individual users may be relocated between usage of CB and scheduled resources.

For example, if a user is currently using only scheduled resources and the user's individual usage metric indicates that the user's uplink transmissions are appropriate for the CB resources, the user may then be authorized to use the CB resources and/or may be reallocated to use the CB resources, either in whole or in part.

Conversely, a CB user having a usage metric more consistent with use on scheduled resources may be relocated from CB usage to solely scheduled usage. Additional details of various embodiments of these aspects are described below.

For example, in one embodiment, a base station or eNB may monitor packet arrival time and burst sizes, which may then be used to generate both individual user and aggregate usage metrics. Those users having a combination of higher variability in "burst" (a set of packets) arrival times and below average burst sizes with regard to a reference or aggregate metric may then be authorized to or assigned to use CB uplink resources. These characteristics (e.g., high variability and below average size) would indicate that it may be wasteful and cumbersome to keep uplink control resources assigned to the user as well as for the base station to undertake corresponding processing tasks (such as, for example, CQI reporting, Scheduling Request, buffer status reports and associated maintenance, maintenance of timing control by the base station and associated issuance of timing adjust commands, etc). In general, for such traffic (and/or other types of wasteful traffic), it may be desirable to avoid wasting airlink resources and maintaining state at the base station.

An embodiment of this approach may be implemented as follows. Empirical burst sizes may be tracked to compute an aggregate metric as a moving average and variance. If the average is below a threshold, and standard deviation to average ratio (coefficient of variation) is above a threshold, then the user may be moved to or authorized to use the CB uplink resources.

Alternately, or in addition, the fraction of traffic that is control traffic for every byte of useful uplink data transferred by the user may be evaluated (e.g., a data to control metric may be generated). The control information may include both downlink control (such as the PDCCH assignments spent on this UL data) and uplink control (Scheduling Requests, Buffer Status Reports etc). If this ratio of control used per uplink byte of data is higher than a threshold, then the user may be moved to or authorized to use the CB uplink resources.

One embodiment of a method of determining this is via tracking the history of previous traffic and assignments. This may be done as follows:
1. Denote by $t_1$ as the time when the scheduling request at the start of the burst is received
2. Let $\Delta$ be the acceptable packet delay for packets corresponding to this Logical Channel Group (LCG).
3. Let $t_2$ denote the minimum of $(t_1+\Delta)$ and the time when the buffer becomes empty
4. Perfect knowledge method: Denote by $B(t_3, t_2)$ the number of bytes that arrived between the two times. Compute the overhead spectral resources as one corresponding to (i) one SR, (ii) one BSR, (iii) one PDCCH assignment. Denote the overhead by O. Then move the UE's LCG to contention-based access if $O>\kappa B(t_1, t_2)$ for some constant $\kappa$. Note that his is an underestimate in overhead because a scheduler may need to exploit multi-user diversity, and therefore may not want to wait until the delay deadline to schedule etc. Note that the constant $\kappa$ has units of Hz*ms/bytes. This constant can depend on the efficiency of the CB access channel which can be monitored.
5. Actual overhead method: In this approach, the overhead may be computed based on the actual scheduling policy used. Denote by $O(t_1, t_2)$ as the actual overhead invested for this LCG of the UE to send SR, BSRs, PDCCH's. Then move the UE's LCG to contention-based access if $O(t_1, t_2) > \kappa B(t_1, t_2)$ for some constant $\kappa$.
6. A combination of methods above and one where instead of thresholds, users with the highest metrics to be moved, are actually moved to CB access.

Conversely, in some cases users may be moved from contention-based access to scheduled access, such as on the Physical Uplink Shared Channel (PUSCH). For example, loading on the CB resources may be monitored to determine whether one or more CB users should be moved. This may be done, for example, by monitoring the state variable as described previously. For example, when the state variable results in low transmission probability values at the UEs, loading may be reduced by moving users to scheduled channels and/or restricting users' CB resource access. In some cases when loading become excessive on the allocated CB resources, the eNB may reallocate the resources, such as changing the subband bandwidth, changing allocated time-frequency resources, allocating additional resources, etc. This may be combined with user relocation to reduce loading on the CB resources.

In one embodiment of user transfer from CB resources, the load on the CB resources (e.g., CB access channel) may be monitored to determine when to start moving one or more users to the "regular" scheduled uplink channel (PUSCH). Loading may be measured, for example, in terms of deviations of Interference Power Over Thermal Noise Power (IOT) over a threshold and/or through the determination of collisions on the contention-based access (e.g. high energy on the CB channel, but no detections of users).

Alternately, or in addition, loading may also be determined via missed latency targets of packets—this may be indicated in packet transmissions via, e.g., conveying information about latency in a MAC control element.

When moving users are moved to scheduled channels (e.g., PUSCH) the process may start by moving the user with the least variance in burst/packet arrival time and burst size. Such a user would be deemed somewhat "regular" and hence movable to PUSCH.

Similar transmission criteria to that described previously may be used. For example, users with average burst size greater than a threshold may be moved. Among these, users with a minimum standard deviation to average ratio may be further considered for movement.

The start of a burst can be indicated via a MAC control element containing a time-stamp of when the packet arrived. This MAC control element may be sent with the first packet after the buffer at the UE goes from empty to non-empty. We can also explicitly compute the approximate overhead such a user would incur if moved to PUSCH may also be explicitly determined. Based on this, a decision may be made as to whether to move users with a minimal percentage overhead. To determine this, a computation related to the "Perfect Knowledge" implementation may be used. In this case, the start and end of a burst may be determined via received packets rather than via SR, BSR. Alternatively, the start of burst can be determined via a method such as use of a MAC control element containing a time-stamp. If there are multiple logical channels at a user, some of which are preferably served on PUSCH, then those users may be allocated a lower probability of being authorized to use or assigned to CB uplink resources.

Figure 12:
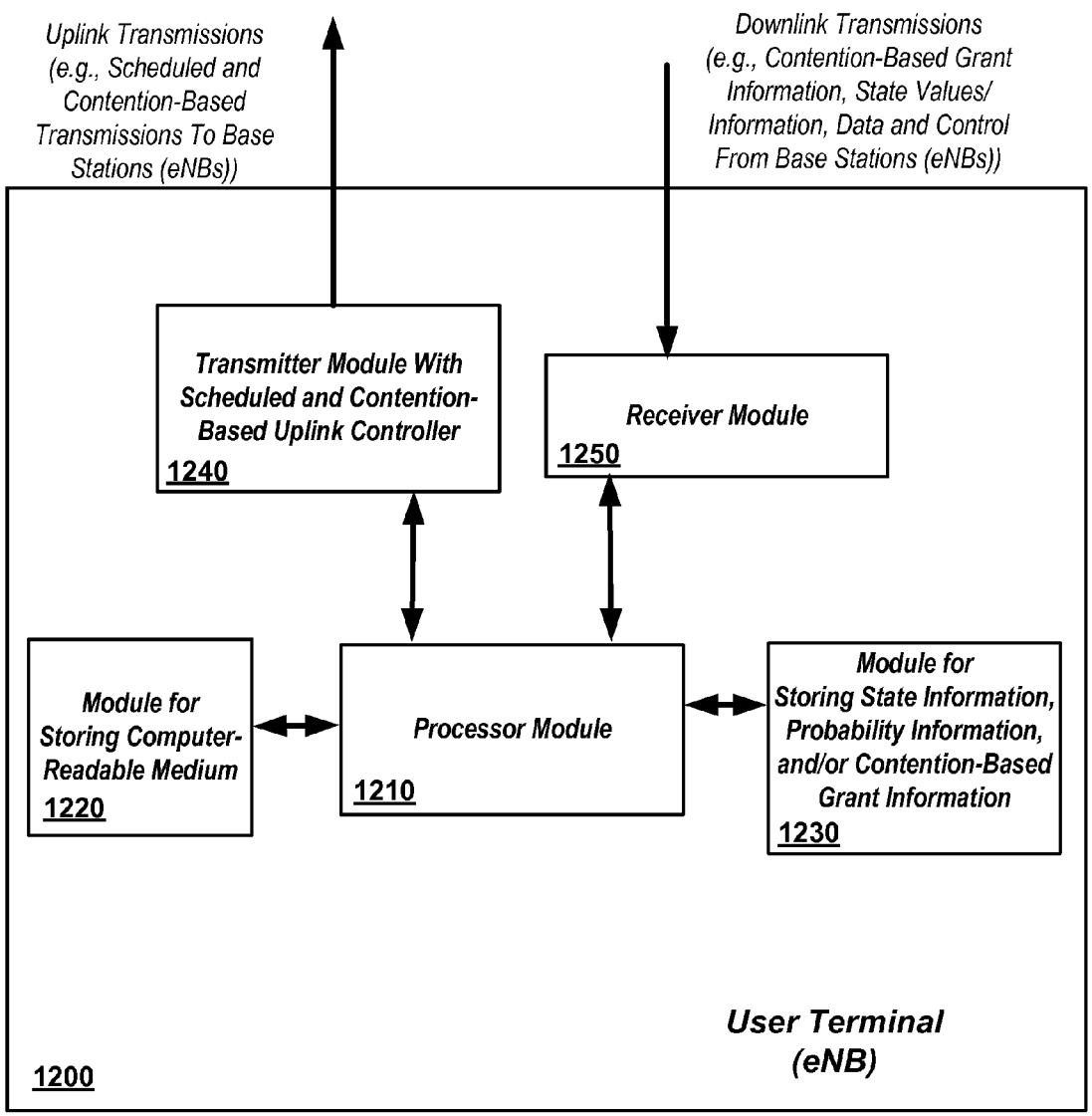
FIG. 12 illustrates an embodiment of a user terminal or UE for use in a wireless communication system.

Referring now to FIG. 12, illustrated is an embodiment of a user terminal 1200, which may correspond to user terminals described previously herein, such as UE 350 of FIG. 3 or UEs 520-550 of FIG. 5. Terminal 1200 may include one or more processor modules 1210, which may include one or more processors as well as associated components, such as I/O modules, buses, memories, and the like. Processor module 1210 may be configured to implement the contention-based functions as described previously herein, and in particular processing functions associated with FIGS. 7 and 9. One or more modules for storing computer readable media 1220 may be coupled to processor modules 1210, and may be used to store computer-readable media containing instructions to perform the various user terminal or UE functions described herein. One or more memory modules 1230, such as memories configured to store information such as user terminal identity, cell identity, transmission probabilities, state values, CB grant information, and/or other data or information as described herein may be coupled to processor module 1210 to facilitate performing the functions described herein.

Terminal 1200 may also include one or more transmitter modules 1240 configured to communicate with other wireless network nodes. These other nodes may be, for example, base stations such as eNB 310 of FIG. 3 or eNB 510 of FIG. 5. Transmitter module 1240 may be coupled to processor module 1210 and/or to memory or other modules (not shown) to facilitate performance of the transmit-related processing functions described herein, including sending contention-based uplink transmissions in allocated CB resources. Similarly, terminal 1200 may include one or more receiver modules 1250, which may similarly be coupled to processor module 1210 and/or to memory or other modules (not shown) to facilitate performance of the receive-related processing functions described herein, including receiving contention-based resource grant information and state information.

Figure 13:
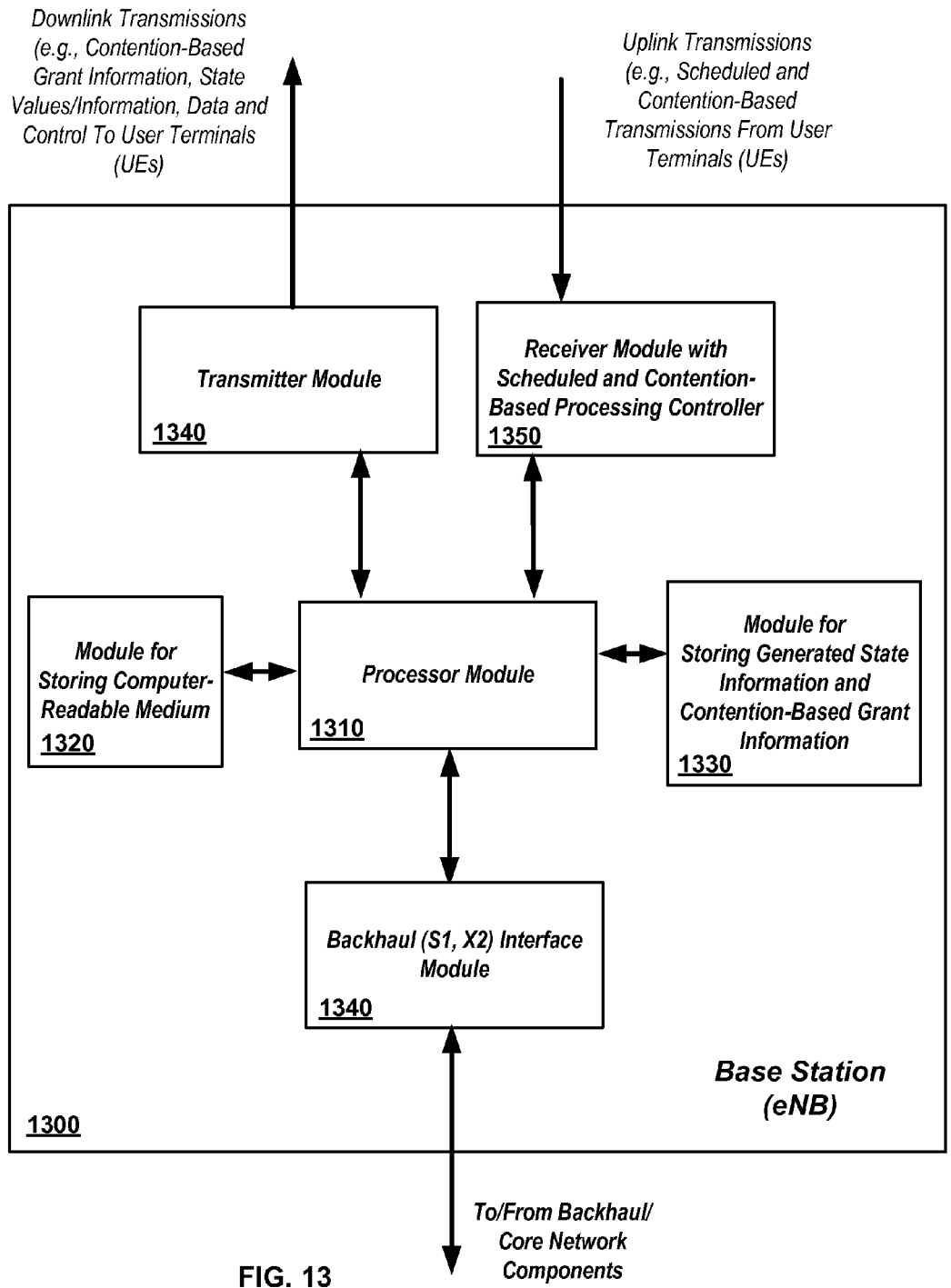
FIG. 13 illustrates an embodiment of a base station or eNB for use in a wireless communication system.

Referring now to FIG. 13, illustrated is an embodiment of a base station 1300, which may correspond to base stations described previously herein, such as eNB 310 or eNB 510. Base station 1300 may include one or more processor modules 1310, which may include one or more processors as well as associated components, such as I/O modules, buses, memories, and the like. Processor module 1310 may be configured to implement the base station/eNB processing functions as described herein, and in particular processing functions associated with FIGS. 6, 8, 10, and 11.

One or more modules for storing computer readable media 1320 may be coupled to processor modules 1310, and may be used to store computer-readable media containing instructions to perform the various base station functions described herein. One or more memory modules 1330, such as memories configured to store information such as user terminal identity, cell identity, user terminal context, state information, CB resource information, user terminal uplink usage information, and/or other data or information as described herein may be coupled to processor module 1310 to facilitate performing the various contention-based base station scheduling and signaling functions described herein.

Base station 1300 may also include one or more transmitter modules 1340 configured to communicate with other wireless network nodes. These other nodes may be, for example, user terminals, such as UEs 350 and 520-550. Base station 1300 may also be other base stations (not shown). Transmitter module 1340 may be coupled to processor module 1310 and/or to memory or other modules (not shown) to facilitate performance of the contention-based transmit-related processing functions described herein, such as sending state information and contention-based grant information.

Similarly, base station 1300 may include one or more receiver modules 1350, which may similarly be coupled to processor module 1310 and/or to memory or other modules (not shown) to facilitate performance of the receive-related processing functions described herein, and in particular with regard to user terminals such as UEs 350 and 520-550. Base station 1310 may also include one or more Backhaul/CN interface modules 1360. Modules 1360 may be configured to interface to core network elements, such as with other base stations or core network elements (not shown). The interface may be via wired connections, such as S1 connections, and/or may include wireless connectivity.

In some configurations, the apparatus for wireless communication includes means for performing various functions as described herein. In one aspect, the aforementioned means may be a processor or processors and associated memory in which embodiments reside, such as are shown in FIGS. 3, 12, and 13, and which are configured to perform the functions recited by the aforementioned means. The may be, for example, modules or apparatus residing in UEs, eNBs, and/or other network nodes to perform the contention-based access signaling and scheduling functions and/or other functions as are described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable storage medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

What is claimed is:

1. A method for wireless communications, comprising:
   determining contention-based grant information including information allocating a subset of system resources for contention-based access;
   signaling the contention-based grant information to one or more user devices;
   measuring a first set of contention-based uplink transmissions received during a first uplink transmission period to generate a power metric;
   determining a state value indicating a loading metric over the subset of system resources for contention-based access based upon the power metric and a background noise metric, wherein the determining the state value comprises computing a ratio of the power metric to the background noise metric, and wherein the determining the state value further comprises:
      decrementing a previous state value if the ratio is less than a predefined threshold value; and
      incrementing the previous state value if the ratio is not less than the predefined threshold value; and
   signaling the state value to the one or more user devices, wherein the state value is usable by the one or more user devices for scheduling a second set of contention-based uplink transmissions in the subset of system resources during a second uplink transmission period based at least in part on the loading metric.

2. The method of claim 1, wherein the allocation of the subset of system resources is based at least in part on non-contention-based uplink loading at a base station.

3. The method of claim 1, wherein the allocation of the subset of system resources is based at least in part on a number of user devices served by a base station.

4. The method of claim 1, wherein the allocation of the subset of system resources is based at least in part on a predefined proportion of the total system bandwidth.

5. The method of claim 1, wherein the allocation of the subset of system resources is based at least in part on a Quality of Service (QoS) requirement.

6. The method of claim 1, wherein the subset of system resources comprises a sub-band of the total system bandwidth allocated exclusively for contention-based access.

7. The method of claim 1, wherein the subset of system resources comprises a subset of available time-frequency system resources allocated exclusively for contention-based access.

8. The method of claim 1, wherein the subset of system resources is semi-statically allocated.

9. The method of claim 1, wherein the subset of system resources is dynamically allocated.

10. The method of claim 1, wherein the contention-based grant information further includes Modulation and Coding Scheme (MCS) information.

11. The method of claim 1, wherein the contention-based grant information further includes spreading code information usable by the one or more user devices to spread data in the uplink transmission periods.

12. The method of claim 1, wherein the power metric is based on a total power associated with the first contention-based uplink transmissions and the background noise metric is based on a total background noise in the subset of system resources.

13. The method of claim 1, wherein the state value comprises a non-negative integer value based on the ratio.

14. The method of claim 1, wherein the signaling the contention-based grant information comprises sending the contention-based grant information using one of a downlink control channel and a system broadcast channel.

15. The method of claim 1, wherein the signaling a state value comprises sending the state value using one of a downlink control channel and a system broadcast channel.

16. The method of claim 1, further comprising:
   determining another contention-based grant information including allocating a another subset of system resources for contention-based access, wherein the another subset of system resources is different from the subset of system resources; and
   signaling the another contention-based grant information to the one or more user devices.

17. The method of claim 1, further comprising:
   receiving, from one of the one or more user devices, a first contention-based uplink transmission consistent with the contention-based grant information;
   receiving, from a second of the one or more user devices, a second contention-based uplink transmission, wherein the second contention-based uplink transmission collides with the first contention-based uplink transmission; and
   decoding one of the first and second contention-based uplink transmissions.

18. The method of claim 1, wherein the state value is signalled to a first subset of the one or more user devices; the method further comprising signalling another state value to a second subset of the one or more user devices, wherein the second subset is different from the first subset.

19. The method of claim 1, further comprising determining, based on a characteristic associated with the one or more user devices, whether to allow contention-based access for the one or more user devices.

20. The method of claim 19, wherein the characteristic relates to uplink data transmissions from the one or more user devices.

21. The method of claim 1, wherein the state value and the contention-based grant information are signalled to a first subset of the one or more user devices, wherein the first subset of the one or more user devices is determined based at least in part on uplink transmissions from the first subset of the one or more user devices;
   the method further comprising:
      determining second contention-based grant information including information allocating a second subset of system resources for contention-based access by a second subset of the one or more user devices; and signalling the second contention-based grant information to the second subset of user devices, wherein the second subset of the one or more user devices is different from the first subset of the one or more user devices.

22. The method of claim 21, further comprising:
determining another state value; and
signalling the another state value to the second subset of the one or more user devices.

23. The method of claim 1, further comprising determining whether to reallocate scheduled system resources as contention-based system resources based at least in part on the state value.

24. A computer program product for wireless communication, the computer program product comprising:
a non-transitory computer-readable medium having program code recorded thereon, the program code comprising:
program code to determine contention-based grant information including information allocating a subset of system resources for contention-based access;
program code to signal the contention-based grant information to one or more user devices;
program code to measure a first set of contention-based uplink transmissions received during a first uplink transmission period to generate power metric;
program code to determine a state value indicating a loading metric over the subset of system resources for contention-based access based upon the power metric and a background noise metric; wherein the program code to determine the state value comprises program code to compute a ratio of the power metric to the background noise metric, and wherein the program code to determine the state value further comprises program code to:
decrement a previous state value if the ratio is less than a predefined threshold value; and
increment the previous state value if the ratio is not less than the predefined threshold value; and
program code to signal the state value to the one or more user devices, wherein the state value is usable by the one or more user devices in scheduling of a second set of contention-based uplink transmissions in the subset of system resources during a second uplink transmission period based at least in part on the loading metric.

25. The computer program product of claim 24, wherein the program code further comprises:
program code to determine another contention-based grant information including allocating a another subset of system resources for contention-based access, wherein the another subset of system resources is different from the subset of system resources; and
program code to signal the another contention-based grant information to the one or more user devices.

26. The computer program product of claim 24, wherein the subset of system resources comprises a sub-band of the total system bandwidth allocated exclusively for contention-based access.

27. An apparatus for wireless communications, comprising:
at least one processor configured to:
determine contention-based grant information including information allocating a subset of system resources for contention-based access;
signal the contention-based grant information to one or more user devices;
measure a first set of contention-based uplink transmissions received during a first uplink transmission period to generate a power metric;
determine a state value indicating a loading metric over the subset of system resources for contention-based access based upon the power metric and a background noise metric, wherein to determine the state value the processor is configured to compute a ratio of the power metric to the background noise metric, and wherein to determine the state value the processor is further configured to:
decrement a previous state value if the ratio is less than a predefined threshold value; and
increment the previous state value if the ratio is not less than the predefined threshold value; and
signal the state value to the one or more user devices, wherein the state value is usable by the one or more user devices in scheduling of a second set of contention-based uplink transmissions in the subset of system resources during a second uplink transmission period based at least in part on the loading metric; and
a memory coupled to the at least one processor.

28. A communications device, comprising:
means for determining contention-based grant information including information allocating a subset of system resources for contention-based access;
means for signaling the contention-based grant information to one or more user devices;
means for measuring a first set of contention-based uplink transmissions received during a first uplink transmission period to generate a power metric;
means for determining a state value indicating a loading metric over the subset of system resources for contention-based access based upon the power metric and a background noise metric, wherein the means for determining the state value comprises means for computing a ratio of the power metric to the background noise metric, and wherein the means for determining the state value further comprises:
means for decrementing a previous state value if the ratio is less than a predefined threshold value; and
means for incrementing the previous state value if the ratio is not less than the predefined threshold value; and
means for signaling the state value to the one or more user devices, wherein the state value is usable by the one or more user devices in scheduling of a second set of contention-based uplink transmissions in the subset of system resources during a second uplink transmission period based at least in part on the loading metric.

29. The communications device of claim 28, further comprising means for determining, based on a characteristic associated with the one or more user devices, whether to allow contention-based access for the one or more user devices.

30. The communications device of claim 29, wherein the characteristic relates to uplink data transmissions from the one or more user devices.

31. The communications device of claim 28, wherein the state value and the contention-based grant information are signalled to a first subset of the one or more user devices, wherein the first subset of the one or more user devices is determined based at least in part on uplink transmissions from the first subset of the one or more user devices;

the communications device further comprising:

means for determining second contention-based grant information including information allocating a second subset of system resources for contention-based access by a second subset of the one or more user devices; and means for signalling the second contention-based grant information to the second subset of user devices, wherein the second subset of the one or more user devices is different from the first subset of the one or more user devices.

* * * * *